United States Patent
Sugino et al.

(10) Patent No.: US 7,627,731 B2
(45) Date of Patent: Dec. 1, 2009

(54) STORAGE APPARATUS AND DATA MANAGEMENT METHOD USING THE SAME

(75) Inventors: Shoji Sugino, Odawara (JP); Yoshinori Igarashi, Odawara (JP); Eiju Katsuragi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 11/701,389

(22) Filed: Feb. 2, 2007

(65) Prior Publication Data
US 2008/0147960 A1 Jun. 19, 2008

(30) Foreign Application Priority Data
Dec. 13, 2006 (JP) .............................. 2006-335452

(51) Int. Cl.
*G06F 12/00* (2006.01)
(52) U.S. Cl. .................... 711/170; 711/114; 711/162
(58) Field of Classification Search ................. 711/100, 711/162, 170
See application file for complete search history.

(56) References Cited

U.S. PATENT DOCUMENTS

| | | | |
|---|---|---|---|
| 5,129,088 A * | 7/1992 | Auslander et al. ............... | 711/1 |
| 5,333,315 A * | 7/1994 | Saether et al. ................... | 707/1 |
| 6,021,464 A * | 2/2000 | Yao et al. ....................... | 711/114 |
| 6,173,362 B1 * | 1/2001 | Yoda ............................. | 711/114 |
| 6,282,670 B1 * | 8/2001 | Rezaul Islam et al. .......... | 714/6 |
| 6,711,649 B1 * | 3/2004 | Bachmat et al. ............... | 711/114 |
| 6,725,328 B2 | 4/2004 | Kano et al. | |
| 7,065,615 B2 | 6/2006 | Sugino et al. | |
| 2003/0191916 A1 * | 10/2003 | McBrearty et al. ........... | 711/162 |
| 2006/0059301 A1 | 3/2006 | Sugino et al. | |
| 2006/0090055 A1 * | 4/2006 | Itoh ............................. | 711/170 |

FOREIGN PATENT DOCUMENTS

| | | | |
|---|---|---|---|
| JP | 01250150 A | * | 10/1989 |
| JP | 2003-015915 | | 7/2001 |
| JP | 2005-196673 | | 1/2004 |
| JP | 2006-079432 | | 9/2004 |
| WO | WO 2004109517 A1 | * | 12/2004 |

* cited by examiner

*Primary Examiner*—Reginald G Bragdon
*Assistant Examiner*—Daniel J Bernard
(74) *Attorney, Agent, or Firm*—Stites & Harbison PLLC; Juan Carlos A. Marquez, Esq.

(57) ABSTRACT

The expansion of a mapping table with additional mapping information involved in the access to virtual volumes is prevented and so a search in the mapping information within a valid time period is ensured, thereby preventing degradation of system performance. A storage apparatus, which defines virtual volumes to which storage areas are dynamically allocated, has a data migration function to migrate data between the virtual volumes and real volumes. With the data migration function, the mapping information for the migrated data is deleted from the mapping table, and accordingly, the size of the mapping table can be limited.

12 Claims, 25 Drawing Sheets

FIG.5

SEGMENT MANAGEMENT TABLE

| Disk ID | Segment # | LBA_start | LBA_end | In_use |
|---------|-----------|-----------|---------|--------|
| 0 | 0 | 0 | 499 | 1 |
| 0 | 1 | 500 | 1799 | 1 |
| 0 | 2 | 1800 | 2999 | 0 |
| 0 | 3 | 1800 | 2999 | 1 |
| : | : | : | : | : |
| 1 | 6 | 0 | 699 | 0 |
| 1 | 7 | 700 | 2999 | 1 |
| : | : | : | : | : |

FIG.6

ADDRESS MANAGEMENT TABLE

| LUN | Segment # | LBA_start | LBA_end | Pool |
|---|---|---|---|---|
| 0 | 1 | 0 | 1299 | 0 |
| 0 | 6 | 1300 | 1999 | 0 |
| 1 | 2 | 0 | 1199 | 0 |
| 2 | 8 | 0 | 299 | 0 |
| : | : | : | : | : |
| 9 | 8 | 19000 | 19999 | 1 |
| : | : | : | : | : |

FIG.9

OPERATIONAL INFORMATION MANAGEMENT TABLE

| | PROPERTY |
|---|---|
| WWN | Throughput (IO/s) |
| | Data transfer amount (MB/s) |
| | Response time (ms) |
| CHA | Throughput (IO/s) |
| | Data transfer amount (MB/s) |
| | Processor operation rate (%) |
| FRONT-END ACCESS PATH | CHA-CSW operation rate (%) |
| | CHA-CM operation rate (%) |
| | CHA-SM operation rate (%) |
| CM | Cache usage rate (%) |
| | Write pending rate (%) |
| | Read bit rate (%) |
| BACK-END ACCESS PATH | Data transfer amount (MB/s) |
| | CM-DKA operation rate (%) |
| | DKA-SM operation rate (%) |
| PARITY GROUP | Throughput (IO/s) |
| | Cache hit rate (%) |
| | Back-end performance (number of counters) |
| REAL VOLUME | Throughput (IO/s) |
| | Data transfer amount (MB/s) |
| | Usage rate (%) |
| VIRTUAL VOLUME | Usage rate (%) |
| POOL VOLUME | Throughput (IO/s) |
| | Data transfer amount (MB/s) |
| | Usage rate (%) |
| | Table size (Kbyte) |

STORAGE APPARATUS AND DATA MANAGEMENT METHOD USING THE SAME

CROSS-REFERENCES TO RELATED APPLICATIONS

This application relates to and claims priority from Japanese Patent Application No. 2006-335452, filed on Dec. 13, 2006, the entire disclosure of which is incorporated herein by reference.

BACKGROUND

1. Field of the Invention

This invention relates to a storage apparatus and a data management method using the storage apparatus, in particular, to a storage apparatus that defines virtual volumes to which storage areas are dynamically allocated, and a data management method for managing the data in the virtual volumes.

2. Description of Related Art

Using disk arrays has been known as a technique to increase the storage capacities and enhance the speed and reliability of a plurality of hard disk drives by grouping them together logically. RAID is a typical embodiment of such disk arrays.

The storage areas in logical volumes provided by the disk arrays are usually consumed with time. Accordingly, a logical volume expanded technique has been proposed, with which, when all the storage areas in one logical volume are used, unused area(s) of arbitrary size in the disk arrays are selected and combined with the logical volume, thereby expanding the storage area in the logical volume.

JP 2003-15915 A discloses a technique with which a volume-providing apparatus that manages a plurality of disk storage devices provides logical volumes to individual host computers. More specifically, when the storage area assigned the logical block address designated in I/O access does not exist in any logical volume, the volume-providing apparatus dynamically allocates an unused storage area in the disk storage devices to the storage areas in the logical volumes so that the logical volume can be expanded.

For the disk arrays, it is necessary to keep track of the operational conditions of the system for smooth operation. JP 2005-196673 A discloses a technique with which the operational information for a storage control system is accumulated in memory and the accumulated operational information is output to a maintenance terminal device.

Because the storage capacity of a storage apparatus depends on the storage capacities of the physical devices such as hard disk drives mounted in the storage apparatus, if a large-capacity storage apparatus is required, that storage apparatus needs to have many devices. Regarding the actual operation of the storage apparatus, it is better, in terms of costs, to expand the storage capacity in a step-by-step manner while monitoring the condition of the consumption of the storage capacity than to prepare a future-required large storage capacity in the first place.

Moreover, in the storage apparatus capable of dynamically allocating storage areas, once a storage area is allocated, mapping information for that allocation has to be created and added to a mapping table. Accordingly, with the increase in the dynamically-allocated storage areas, the mapping table expands in size and consequently increases the load on the search in the mapping information. This may delay the search in mapping information and so degrades the performance in the overall storage apparatus.

SUMMARY

This invention provides, to a storage apparatus that defines virtual volumes to which storage areas are dynamically allocated, a data migration function for migrating data between the virtual volumes and real volumes. The data migration function includes optimizing the arrangement of data in the volumes according to the usage status of the volumes. With the data migration function, the mapping information for the migrated data is deleted from a mapping table, limiting the size of the mapping table.

In an aspect of the present invention, the invention is a storage apparatus and data management method, with which the capacities of in-use storage areas allocated to virtual volumes are monitored and, when any capacity has exceeded or will exceed a predetermined threshold value, the real data in that virtual volume is migrated to a real volume.

More specifically, the invention provides a storage apparatus including a disk device having a storage medium storing data, and a controller unit for controlling the disk device. The storage apparatus comprises: a first data volume for which a storage capacity larger than the inherent storage capacity of the storage medium is defined, the first data volume including a first real volume associated with a physical storage area in the storage medium and a virtual volume to which a storage area other than the first real volume is allocated; a second data volume including a second real volume associated with another physical storage area in the storage medium; a pool volume to which a storage area is allocated to store the data involved in access to the storage areas allocated to the virtual volume; a pool volume management table storing entries that associate the storage area allocated the virtual volume with the storage area allocated to the pool volumes; a monitor unit configured to monitor the usage rate of the virtual volume; and a transfer unit configured to transfer, in response to a command from the monitor unit, the data stored in the storage area allocated to the pool volume to the second real volume, based on the entries in the pool volume management table.

In an aspect of the present invention, the invention provides a storage apparatus and a data management method, with which the storage capacities of pool volumes storing real data, which is seemingly stored in the in-use storage areas allocated to virtual volumes, are monitored and, when any capacity has exceeded or will exceed a predetermined threshold value, the real data in that virtual volume is migrated to a real volume.

More specifically, this invention also provides a storage apparatus with a disk device having a storage medium storing data, and a controller unit for controlling the disk device. The storage apparatus comprises: a first data volume for which a storage capacity larger than the physical storage capacity of the storage medium is defined, the first data volume including a first real volume associated with a physical storage area in the storage medium and a virtual volume to which a storage area other than the first real volume is allocated; a second data volume including a second real volume associated with another physical storage area in the storage medium; a pool volume to which a storage area is allocated to store the data involved in access to the storage areas allocated to the virtual volume; a pool volume management table storing entries that associate the storage area allocated the virtual volume with the storage area allocated to the pool volumes; a monitor unit configured to monitor the usage rate of the pool volume; and a transfer unit configured to transfer, in response to a command from the monitor unit, the data stored in the pool volume to the second real volume, based on the entries in the pool volume management table.

It would be understood that the above apparatus invention may also be considered as a method invention.

According to the invention, because the expansion of the mapping table with the additional mapping information is prevented and a search in the mapping information within a valid time period is ensured, degradation of the system performance can be prevented.

BRIEF DESCRIPTION OF THE DRAWINGS

FIG. 5 is a diagram showing an example of a segment management table in the storage apparatus according to an embodiment of this invention.

FIG. 6 is a diagram showing an example of an address management table in the storage apparatus according to an embodiment of this invention.

FIG. 9 is a diagram showing an example of an operational information management table in the storage apparatus according to an embodiment of this invention.

DETAILED DESCRIPTION OF PREFERRED EMBODIMENTS

Embodiments of the present invention will be explained below with reference to the drawings.

The storage apparatus according to an embodiment of this invention is a storage apparatus that defines virtual volumes to which storage areas are dynamically allocated and that has a data migration function for migrating data between the virtual volumes and real volumes. With this data migration function, mapping information for the migrated data is deleted from the mapping table, thereby limiting the size of the mapping table.

In other words, with the storage apparatus according to the embodiment of this invention and data management method using the storage apparatus, the in-use portion of the total capacity of the storage areas allocated to each virtual volume is monitored and when it exceeds or is likely to exceed a predetermined threshold value, the real data in the virtual volume is migrated to a real volume.

With a storage apparatus according to another embodiment of this invention and data management method using the storage apparatus, the in-use portion of the total capacity of the storage areas in each pool volume, which actually stores the real data seemingly stored in the in-use storage areas allocated to a virtual volume, is monitored and when the in-use portion exceeds or is likely to exceed a predetermined threshold value, the real data in the virtual volume is migrated to a real volume.

Figure 1:
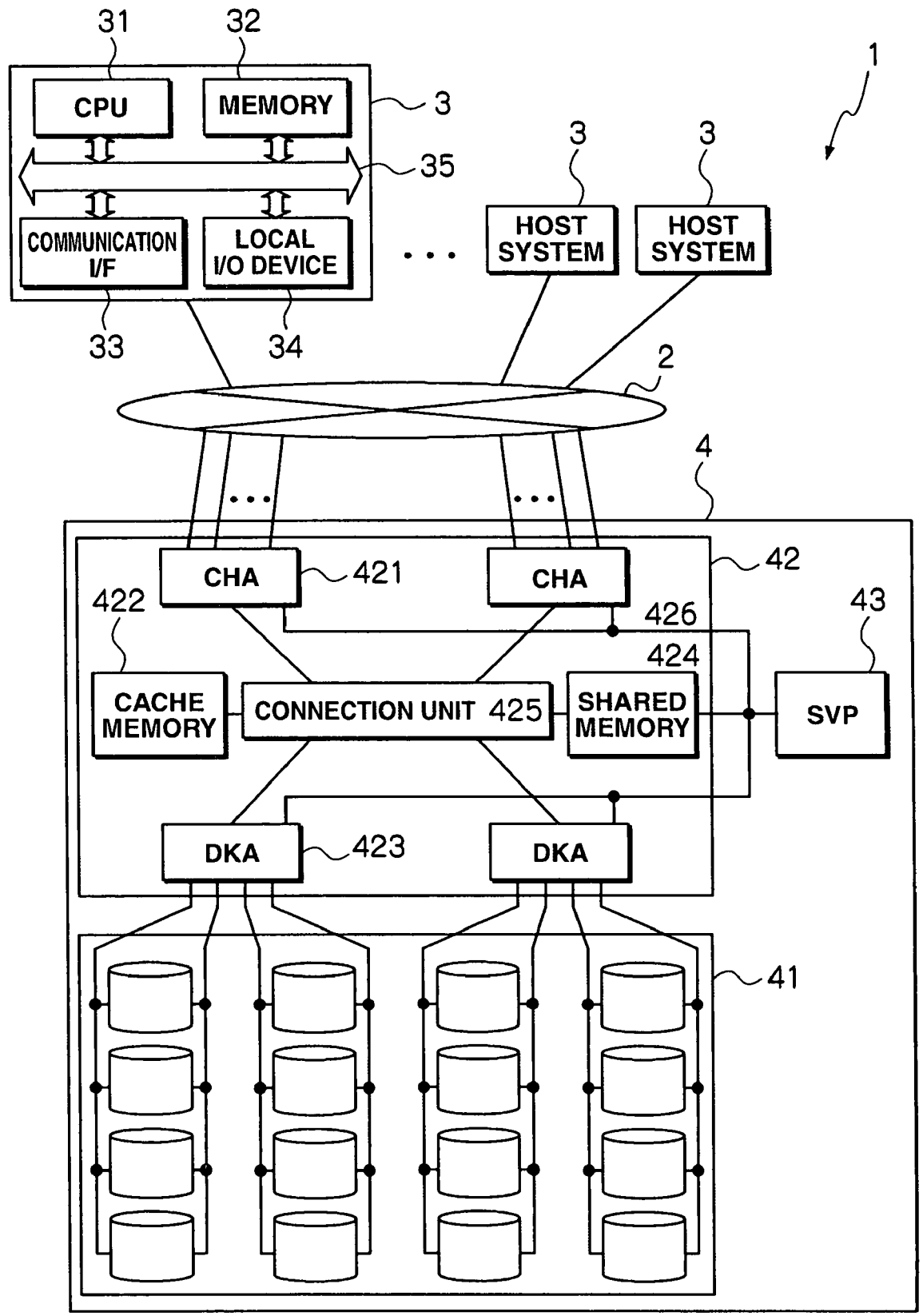
FIG. 1 is a diagram showing the structure of a storage system according to an embodiment of this invention.

FIG. 1 shows the structure of a storage system 1 according to an embodiment of this invention. Referring to FIG. 1, the storage system 1 includes one or more host systems 3 and a storage apparatus 4, which are connected to one another via a network system 2. For example, the storage apparatus 4 stores application data in response to a write command sent from a host system 3, and reads the stored application data and sends it to a host system 3 in response to a read command.

The network 2 is, for example, a LAN, the Internet, SAN (Storage Area Network), or public line. The network 2 typically includes one or more network switches and hubs. Communication between the host systems 3 and storage apparatus 4 via the network 2 is performed based on a predetermined protocol. If the network 2 is a LAN or the Internet, communication is performed based on TCP/IP. If the network 2 is a SAN, communication may be performed based on Fibre Channel Protocol. In this embodiment, it is assumed that the network 2 is a SAN and communication is performed based on Fibre Channel Protocol.

Typical examples of the host systems 3 include general personal computers, work stations and mainframe computers. The host systems 3 are structured, for example, as service systems for banks or airline seat reservation systems. They may belong to different users and each host system 3 may operate different service systems for different users.

Each host system 3 has hardware resources such as a CPU 31, a main memory 32, a communication interface (I/F) 33, and a local input/output (I/O) device 34 and these module or components are connected to one another via an internal bus 35. In FIG. 1 shown in the internal structure of only one of the host systems 3.

Each host system 3 also has software resources such as device drivers, an operating system (OS), and application programs. With these software resources, the host system 3 runs the various programs and executes desired processes in cooperation with the hardware resources under the control of the CPU 31. For example, under the control of the CPU 31, the host system 3 runs a service application program on its OS and realizes the foregoing service system.

The storage apparatus 4 includes one or more disk devices 41, a controller unit 42 for controlling I/O access such as writes and reads to/from the disk devices 41, and a management device 43 for managing the storage apparatus 4. The disk devices 41 and controller unit 42 may be directly connected to each other with the internal bus or connected via an external network.

The disk devices 41 are configured to include storage media such as hard disk drives or non-volatile memories. They form a RAID (Redundant Arrays of Inexpensive Disks) structure. The groups of storage areas provided by the disk devices 41 are defined as one or more logical volumes LU. The logical volumes LU are classified based on their attributes corresponding to their purposes and, in this embodiment, data volumes and pool volumes are defined as logical volumes LU. As will be described later, each data volume is composed of both a real volume and a virtual volume, but it may also be composed only of a real volume or virtual volume. Each logical volume LU is assigned an identifier LUN (Logical Unit Number). It is divided into segments, which are the smallest units in I/O access, and each segment is assigned a logical block address (LBA: Logical Block Address). Accordingly, each host system 3 is capable of accessing data stored in an arbitrary storage area in a specified logical volume LU by giving a logical address composed of an identifier LUN and logical block address LBA to the controller unit 42 in the storage apparatus 4. The above information for the logical volumes LU is stored in the controller unit 42 as a part of the system configuration information.

The storage areas the storage apparatus 4 can provide to the host systems 3 depend on the inherent storage capacities of the respective disk devices 41—physical devices—mounted in the storage apparatus 4. However, in this embodiment, with the virtual volume providing function which will be described later, the storage apparatus 4 can provide a storage capacity larger than the total, inherent storage capacity of the disk devices 41, for example, the storage areas of a future-expanded maximum storage capacity, to the host systems 3. The real (physically existing) storage areas in a logical volume LU provided by the mounted disk devices 41 are defined as a real volume and storage areas other than the real storage areas are defined as a virtual volume. Moreover, real storage areas used for enabling access to the virtual volume are defined as a pool volume.

The controller unit 42 may be a system circuit for collectively controlling the input/output processes (I/O accesses) between the host systems 3 and disk devices 41. More specifically, the controller unit 42 includes a plurality of channel adapters (CHA) 421, a cache memory (CM) 422, a plurality of disk adapters (DKA) 423, and a shared memory (SM) 424, and these modules or components are connected to one another via a connection unit 425 comprising, e.g., a crossbar switch. The controller unit 42 has the aforementioned virtual volume providing function.

Each channel adapter 421 may be a system circuit that functions as a communication interface for transmitting I/O access-related commands and data entities (I/O data) with the host systems 3, which are connected to the storage apparatus 4 via the network 2. The channel adapters 421 are connected to the management device 43 via an internal communication line 426 to enable predetermined communication with it.

The cache memory 422 temporarily stores I/O data transmitted between the host systems 3 and disk devices 41. In other words, it is used for the transmission of I/O data between the channel adapters 421 and disk adapters 423.

Each disk adapter 423 may also be a system circuit that functions as an input/output interface for controlling the access to the disk devices 41. The disk adapters 423 are connected to the management device 43 via the internal communication line 426 to enable predetermined communication with it.

The shared memory 424 stores the information for the storage apparatus 4, e.g., system configuration information and operational information for the storage apparatus 4. The system configuration information relates to the system configuration of the storage apparatus 4. The operational information relates to the operational conditions of the storage apparatus 4 and is collected from the respective modules during the operation of the storage apparatus 4. The shared memory 424 is connected to the management device 43 via the internal communication line 426 so that the management device 43 can refer to the shared memory 424.

The connection unit 425 includes a crossbar switch or the like as mentioned above. It mediates competition between input data signals, switches paths for a data signal, and establishes a path between a source module and destination module.

Figure 2:
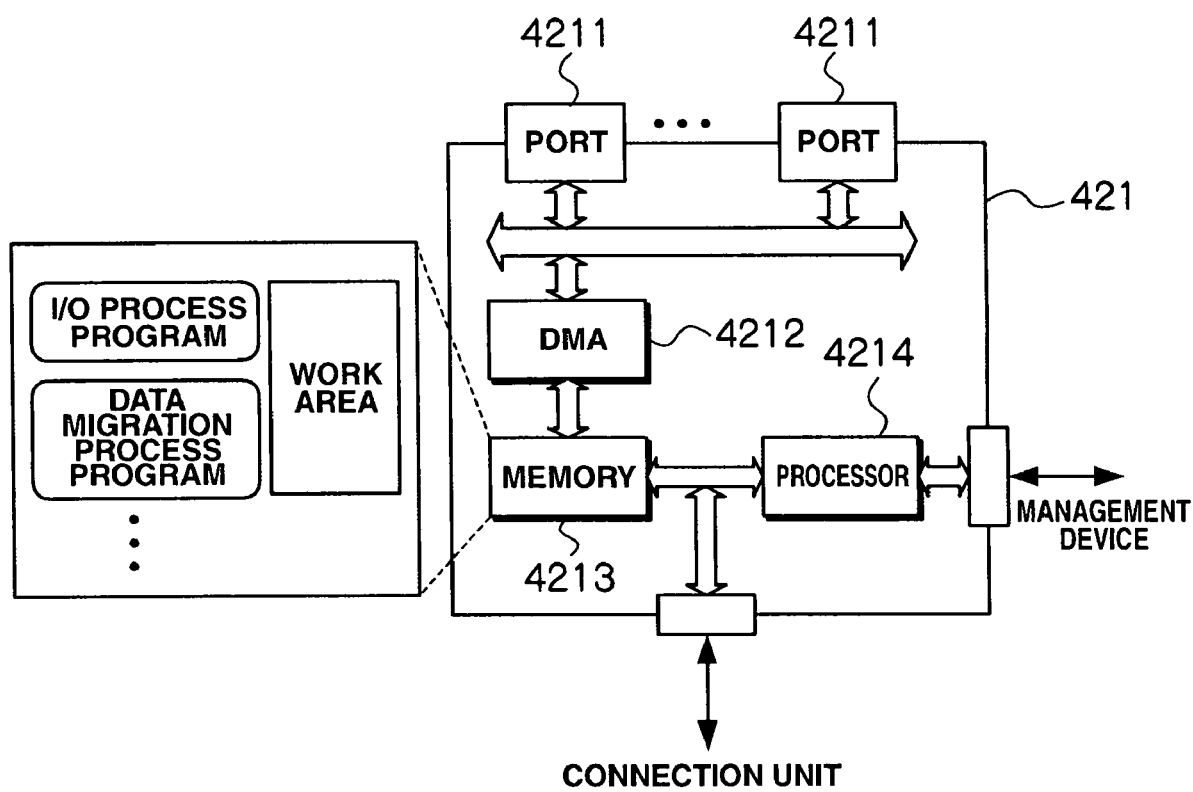
FIG. 2 is a diagram showing the structure of a channel adapter in the storage apparatus according to an embodiment of this invention.

FIG. 2 is a diagram showing the structure of a channel adapter 421 in the storage apparatus 4 according to an embodiment of this invention. As shown in the drawing, the channel adapter 421 includes, for example, a plurality of ports 4211, a DMA 4212, a memory 4213, and a micro processor 4214.

The ports 4211 are connected to ports in network switches in the network 2 via network cables such as optical fibers. Each port 4211 is assigned a network address (such as a WWN) so that it can be identified by the host systems 3. Each port 4211 has a buffer memory (not shown in the drawing) with which it buffers the I/O data (data packets) transmitted to/from the host systems 3. The DMA 4212 is responsible for the transfer of data frames between the buffer memories in the ports 4211 and the memory 4213. The data packets obtained from the network 2 and accumulated in the buffer memories are transferred to the memory 4213 under the control of the DMA 4212.

The micro processor 4214 converts protocols for data packets stored in the memory 4213 and writes the data packets in the cache memory 422 (FIG. 1). In other words, for the received data packets, the micro processor 4214 removes headers etc. and extracts I/O commands and data and sends them to the connection unit 425. Further, for the data read from the disk devices 41 and stored in the cache memory 422, it encapsulates the data according to a predetermined protocol. It refers to the cache memory 422 at regular time intervals or at predetermined timing and obtains the process target I/O data from it. It also obtains its own operational information and writes it in the shared memory 424.

Figure 3:
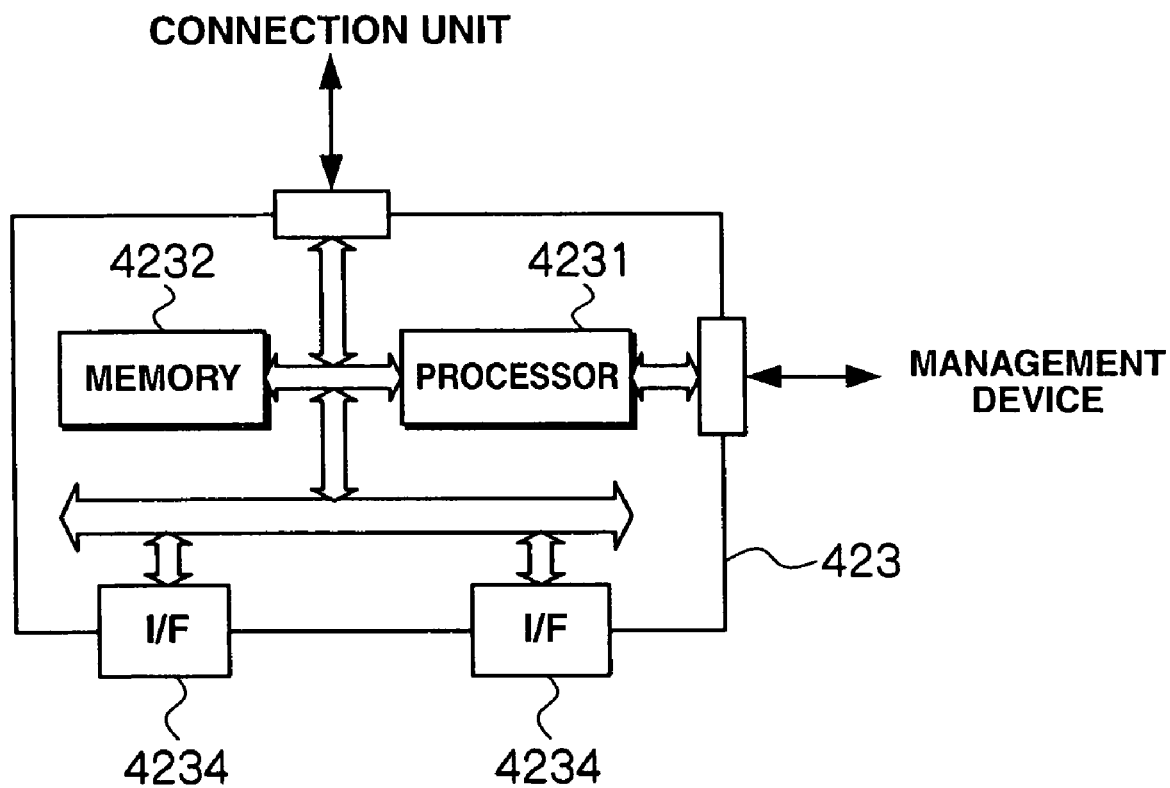
FIG. 3 is a diagram showing the structure of a disk adapter in the storage apparatus according to an embodiment of this invention.

FIG. 3 is a diagram showing the structure of a disk adapter 423 in the storage apparatus 4 according to an embodiment of this invention. As described above, the disk adapter 423 functions as an input/output interface for controlling the access to the disk devices 41. As shown in the drawing, it has a plurality of I/F units 4234, a micro processor 4231, and a memory 4232. It may also include a DMA just like the channel adapter 421.

The I/F units 4234 are connected to the interfaces of the disk devices 41 via predetermined cables. Each I/F unit 4234 has predetermined disk IDs for the disk devices 41 allocated thereto so that it can identify them. It also has an internal buffer memory (not shown in the drawing).

The micro processor 4231 searches for an access target logical volume LU based on the logical address designated in I/O data and accesses that logical volume LU. More specifically, it refers to the cache memory 422 at regular time intervals or at predetermined timing; obtains process target I/O data from the cache memory 422; and sends it to the target disk devices 41. For example, if the I/O data is write-requested data, the micro processor 4231 converts the logical address to a physical address and writes the data entity in the storage area identified by that physical address. Meanwhile, if the I/O data is read-requested data, the micro processor 4231 converts the logical address to a physical address, reads the data entity from the storage area identified by that physical address, and writes it in the cache memory 422. In this embodiment, if the logical address designated in the I/O data is a logical address of a virtual volume, the micro processor 4231 converts the logical address so that the actual data will be written in a pool volume. Also, the micro processor 4231 obtains its own operational information and writes it in the shared memory 424.

Figure 4:
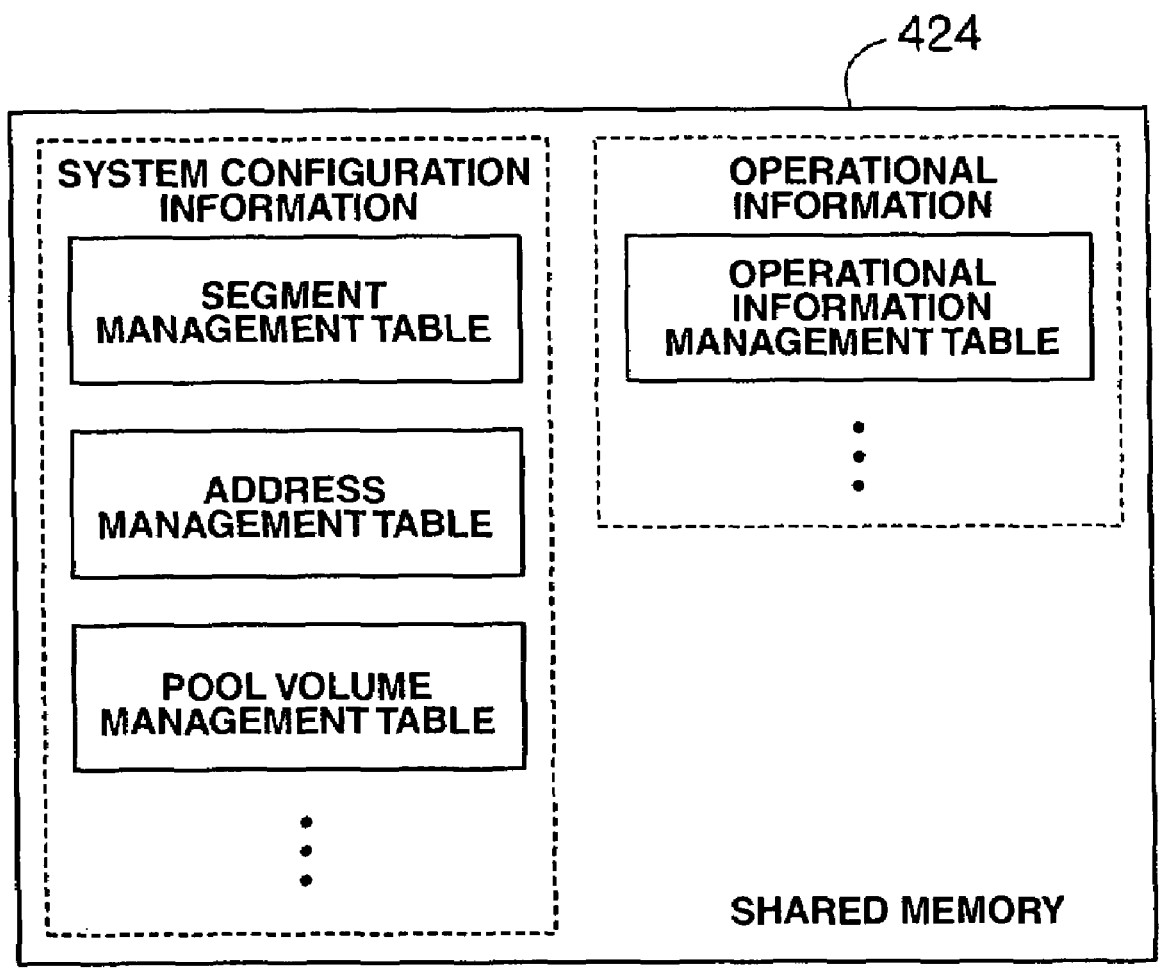
FIG. 4 is a diagram showing the content of a shared memory in the storage apparatus according to an embodiment of this invention.

FIG. 4 shows the content of the shared memory 424 in the storage apparatus 4 according to an embodiment of this invention. The shared memory 424 stores the information regarding the configuration of the storage apparatus 4 (system configuration information) and the information regarding the operational conditions of the storage apparatus 4 (operational information). The system configuration information includes, for example, a segment management table 4241, address management table 4242, and pool volume management table 4243. Likewise, the operational information includes an operational information table 4244.

FIG. 5 shows an example of the segment management table 4241 according to an embodiment of this invention. The segment management table 4241 is for managing the spaces (storage areas) in the logical volumes LU provided in the storage apparatus 4. As shown in FIG. 4, the segment management table 4241 has columns for disk IDs, segment numbers, LBA start addresses, LBA end addresses, and the usage statuses of the segments. The disk IDs are the identifiers for uniquely identifying the storage media constituting the disk devices 41. The segment numbers are for uniquely identifying the segments. The segments are the smallest units of storage areas provided by the disk devices 41 and managed by the controller unit 42. The LBA start addresses and LBA end addresses indicate the physical start and end positions of the segments in the disk devices 41. The size of each segment can be determined by its LBA start address and LBA end address. The usage statuses show whether or not the segments are used. '1' is entered for a segment in use and '0' is entered for a segment not in use.

FIG. 6 shows an example of the address management table 4242 according to an embodiment of this invention. The address management table 4242 is a table associating the storage areas (i.e., logical address spaces) in the logical volumes LU provided in the storage apparatus 4 with the real storage areas (i.e., physical address spaces) in the disk device 41. By reference to the table, the disk adapters 423 convert logical addresses designated in I/O data obtained from the cache memory 422 to physical addresses in the disk devices 41 and access targets according to those physical addresses. Moreover, the table also defines the segments that are set for pool volumes PLU from among the logical volumes LU.

Referring to FIG. 6, the address management table 4242 has columns for logical unit numbers (LUN), segment numbers, LBA start addresses, LBA end addresses, and the pool allocation. The logical unit numbers are for uniquely identifying logical volumes the storage apparatus 4 provides to the host systems 3. The segment numbers are for uniquely identifying storage areas managed in the segment management table 4241. Each logical volume LU is composed of segments. The LBA start addresses and LBA end addresses indicate the logical start and end addresses of the segments. The pool allocation indicates whether or not each segment is used for a pool volume. '1' is entered for a segment used for a pool volume.

Figure 7:
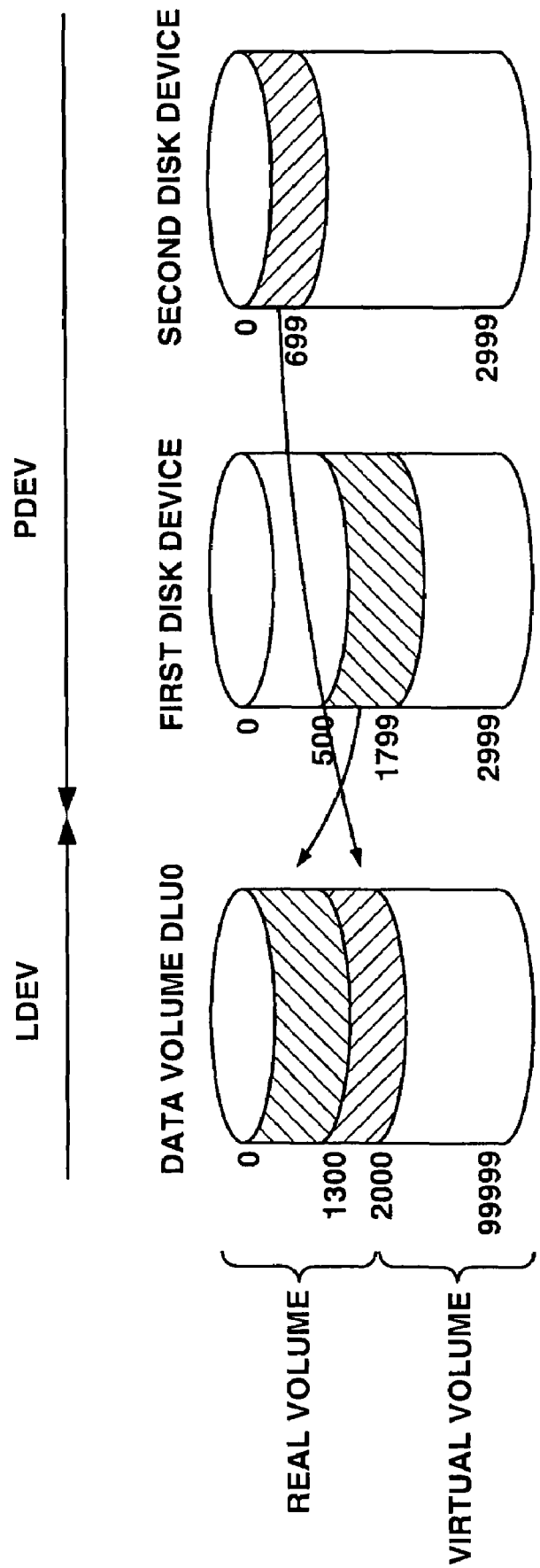
FIG. 7 is a diagram explaining a data volume in the storage apparatus according to an embodiment of this invention.

FIG. 7 is a diagram explaining a data volume in the storage apparatus 4 according to an embodiment of this invention. As shown in FIG. 7, the data volume DLU0 has logical address spaces 0-99999, to which segments in the first and second disk devices 41 are allocated. As shown in FIG. 5, the first disk device 41 is a physical device PDEV assigned a disk ID '0' and the second disk device 41 is a physical device PDEV assigned a disk ID '1.' Also, as shown in FIG. 6, the segment assigned the segment number '1' provides a logical address space 0-1299 in the data volume DLU. The segment assigned the segment number '6' provides a logical address space 1300-1999. Thus, the data volume DLU0 is handled as if it were a single disk device.

No disk device 41—physical device—is allocated to the logical address space 2000-99999 in the data volume DLU0. However, the storage apparatus 4 accepts access to that space from the host system 3 as usual. Therefore, in the storage apparatus 4, logical volumes LU called pool volumes PLU are provided so that the data that is supposed to be stored in the storage areas (virtual storage areas) in the data volumes DLU with no segment in the disk devices 41 allocated thereto is stored in these pool volumes PLU. In other words, in this embodiment, the data seemingly stored in the logical address space 2000-99999 in the data volume DLU0 is actually stored in a pool volume PLU. Accordingly, the access to the virtual volume in a data volume is actually made, inside the storage apparatus 4, to the corresponding pool volume PLU by referring to the pool volume management table 4243.

Figure 8:
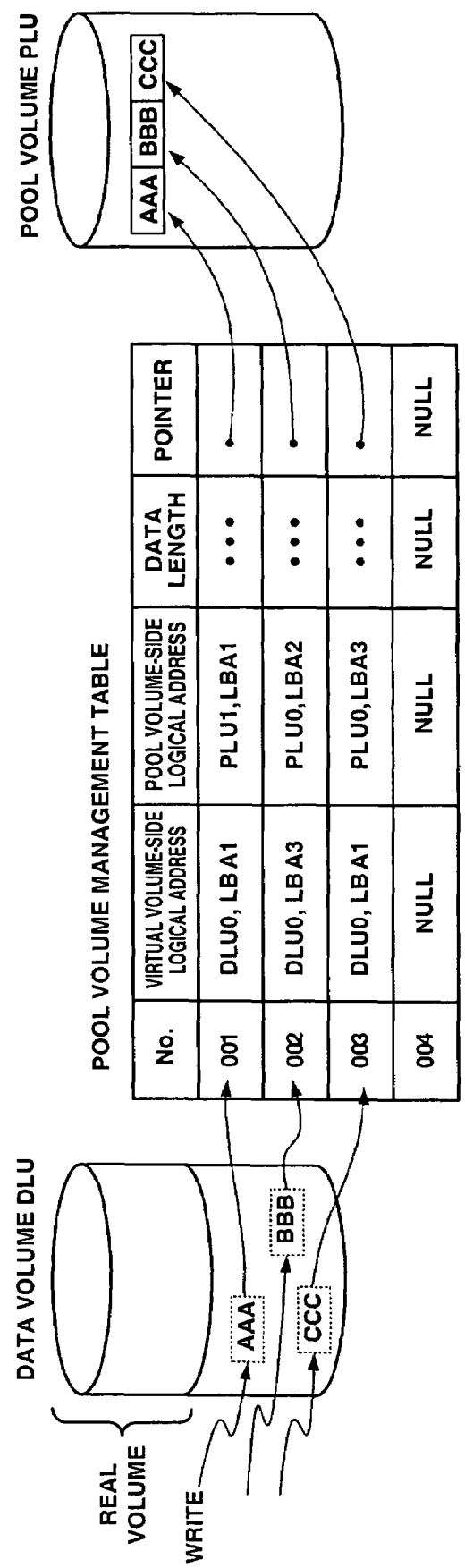
FIG. 8 is a conceptual diagram explaining dynamic allocation of storage areas in the storage apparatus according to an embodiment of this invention.

FIG. 8 is a diagram explaining the concept of dynamic allocation of the storage areas in the storage apparatus 4 according to an embodiment of this invention.

As described above, both data volumes DLU and pool volumes PLU are defined in the disk devices 41 in the storage apparatus 4 according to the embodiment of this invention. The data volumes DLU are the logical volumes LU provided to each host system 3 or user. Each data volume DLU is divided into a real volume and virtual volume depending on the inherent storage capacities of the disk devices 41 mounted in the storage apparatus 4. In other words, the real volumes are associated with the storage areas formed with the segments actually provided by the disk devices 41. In contrast, the virtual volumes are associated with the storage areas with no segment allocated thereto, and thus the data entity is not stored in the virtual volumes. The pool volumes PLU are logical volumes LU providing storage areas where the data entity that is supposed to be stored in the virtual volumes is stored temporarily until additional disk device(s) are mounted, physical area(s) are expanded, and data volume(s) DLU are defined.

In the storage apparatus 4, for the storage areas in the real volumes in the data volumes DLU, correspondence relationships are established between the logical addresses (LUN and LBA) recognized by the host systems 3 and the physical addresses of the corresponding storage areas in the disk devices 41. By reference to the correspondence relationships, the host systems 3 designate desired logical addresses and access the desired storage areas in the disk devices 41.

Meanwhile, for the storage areas in the pool volumes PLU, there are no direct association between the logical addresses recognized by the host systems 3 and the physical addresses in the disk devices for the access to real data. In the storage apparatus 4, when a write request designating a storage area in a virtual volume in a data volume DLU is sent from a host system 3, a storage area is dynamically allocated to the corresponding pool volume PLU in response to the write request. When a read request designating a storage area in a virtual volume in a data volume DLU is sent from a host system 3, the target data is read from the storage area in the corresponding pool volume in response to the read request.

Thus, with the pool volume management table 4243, the storage apparatus 4 manages the association between the virtual volumes and the pool volumes. The pool volume management table 4243 is stored, for example, in the shared memory 424 in the controller unit 42. When the storage apparatus 4 receives a data write request designating a logical address other than those of the real volumes in the data volumes DLU, it stores the data entity in a pool volume PLU, associates the designated logical address with a pointer indicating an address in the pool volume PLU, and registers the correspondence relationship in the pool volume management table 4243.

FIG. 9 shows an example of the operational information management table 4244 according to an embodiment of this invention. Referring to FIG. 9, the table includes various kinds of properties in the storage apparatus 4 and the values of the properties. Incidentally, the properties shown in FIG. 9 are merely examples and this invention is not limited to those properties.

A 'real volume' section includes items such as 'throughput,' 'data transfer amount,' and 'usage rate' for the real volume in each data volume DLU. The 'throughput' is the number of pieces of I/O data addressed to real volumes from among the pieces of I/O data the storage apparatus 4 receives per unit of time. The 'data transfer amount' is the amount of data transferred per unit of time. When processing I/O data, a channel adapter 421 or disk adapter 423 calculates the throughput and data transfer amount and writes them in the shared memory 424. The 'usage rate' is the percentage of data-storing areas in the real volume.

A 'virtual volume' section includes an item such as a 'usage rate' for the virtual volume in each data volume DLU. The 'usage rate' is the percentage of data-storing areas in the virtual volume. As described above, the access to the virtual volume is actually performed to the corresponding pool volume by reference to the pool volume management table 4243, and thus there are no evaluation items such as 'throughput' or 'data transfer amount' in this section.

A 'pool volume' section includes items such as 'throughput,' 'data transfer amount,' 'usage rate' and 'table size' for each pool volume storing the data entity seemingly stored in the corresponding virtual volume. The 'usage rate' is the percentage of data-storing areas in the pool volume. The 'table size' is the size of the data in the pool volume management table 4243.

Figure 10:
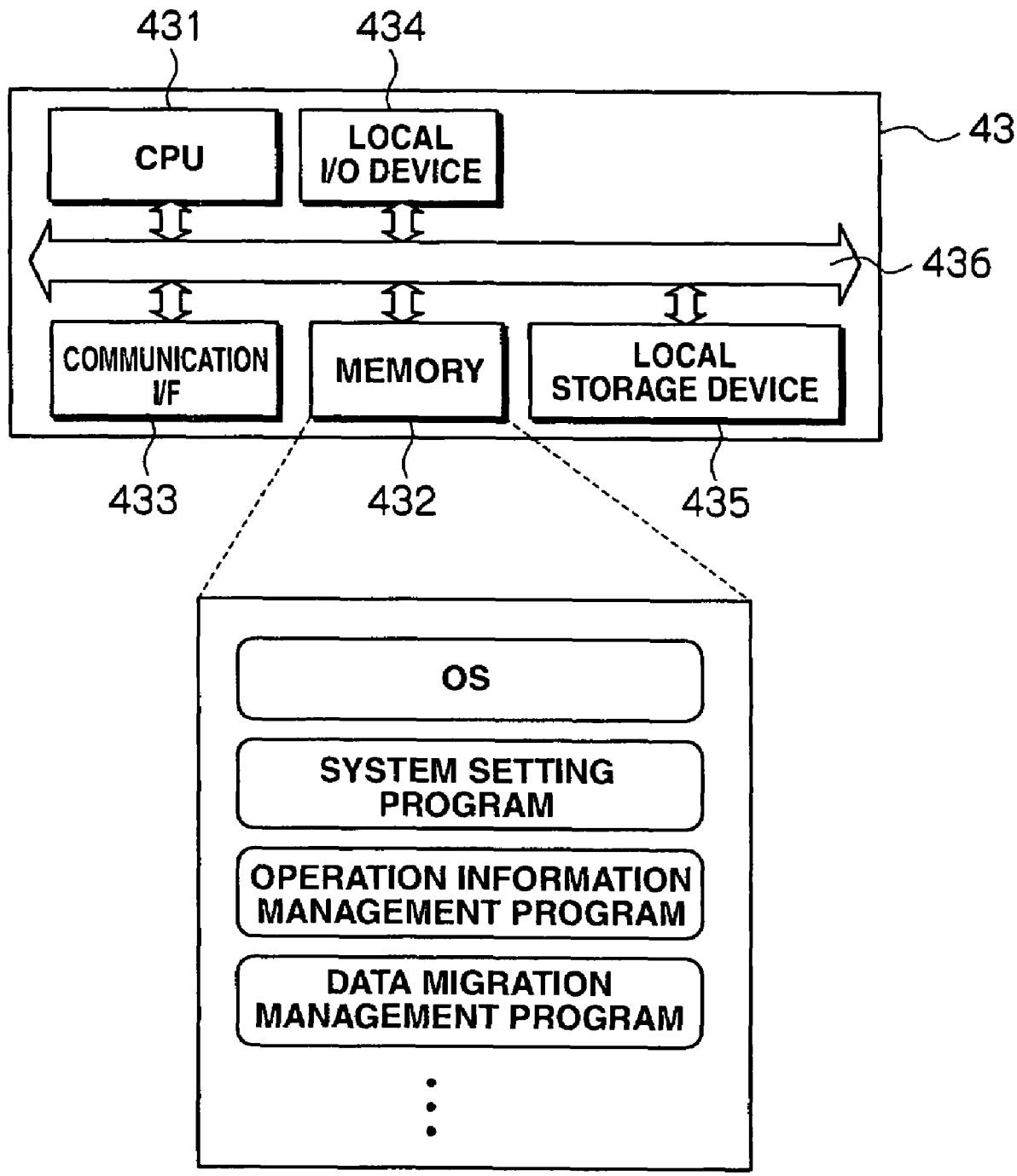
FIG. 10 is a diagram showing the structure of a management device according to an embodiment of this invention.

FIG. 10 is a diagram showing the structure of the management device 43 according to an embodiment of this invention. The management device 43 is typically a terminal device called a 'service processor (SVP)' and a general personal computer may be used as the management device 43. It is connected, via communication ports, to the modules—the channel adapters 421, the disk adapters 423, and the shared memory 424—in the controller unit 42.

Referring to FIG. 10, the management device 43 has hardware resources such as a CPU 431, memory 432, communication interface 433, local I/O device 434, and local storage device 435; as well as software resources such as an operating system, device driver, and management programs. The software resources, being stored in the local storage device 435, are run on the memory 432 as necessary and executed by the CPU 431. In other words, under the control of the CPU 431, the management device 43 executes the various management programs and desired functions. The management programs refer to the operational information management table 4244 in the shared memory 424, obtain the values of relevant properties, and provide them to the system manager via the local I/O device 434. The system manager sends a command to the management device 43 via the local I/O device 434 to make settings for and/or change the system configuration information in the storage apparatus 4.

Figure 11:
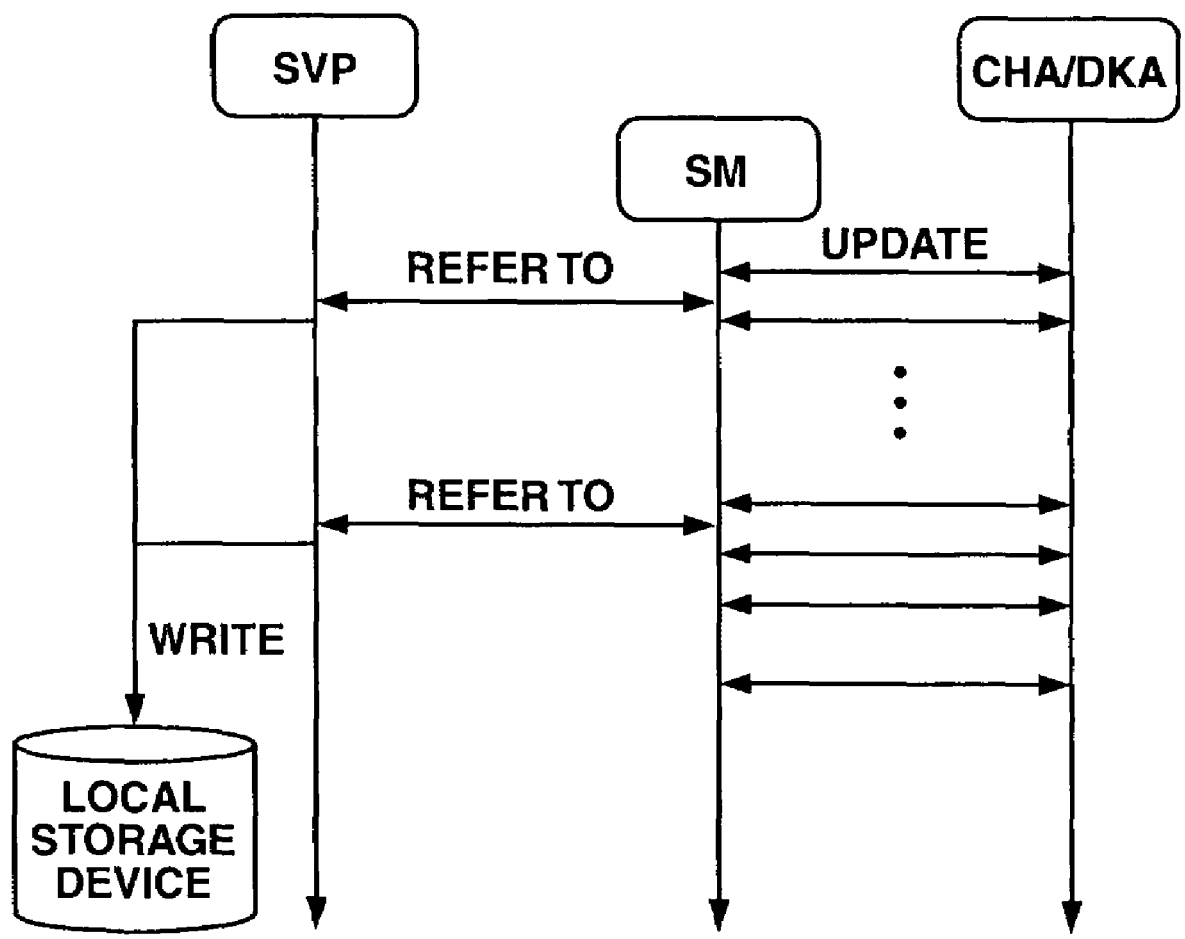
FIG. 11 shows a sequence explaining the operational information collection process by the management device according to an embodiment of this invention.

FIG. 11 shows a sequence explaining the operational information collection process by the management device 43 according to an embodiment of this invention.

The channel adapters (CHA) 421 and disk adapters (DKA) 423 write the values of their properties in the shared memory (SM) 424 at regular time intervals or at predetermined timing.

Periodically, or in response to a command from the system manager, the management device (SVP) 43 refers to the operational information management table 4244 in the shared memory 424, obtains the values of relevant properties, and stores them in the local storage device 435. As a result, the management device 43 can perform various processes based on the obtained property values. For example, when the management device 43 obtains the usage rate of a virtual volume and if the usage rate exceeds a predetermined threshold value, it migrates the data in the pool volume PLU corresponding to that virtual volume to anther unused data volume DLU. Here, the other unused data volume DLU is precisely a real volume to which a real segment provided by the disk devices 41 is allocated, and the data volume DLU may not include a virtual volume.

Figure 12:
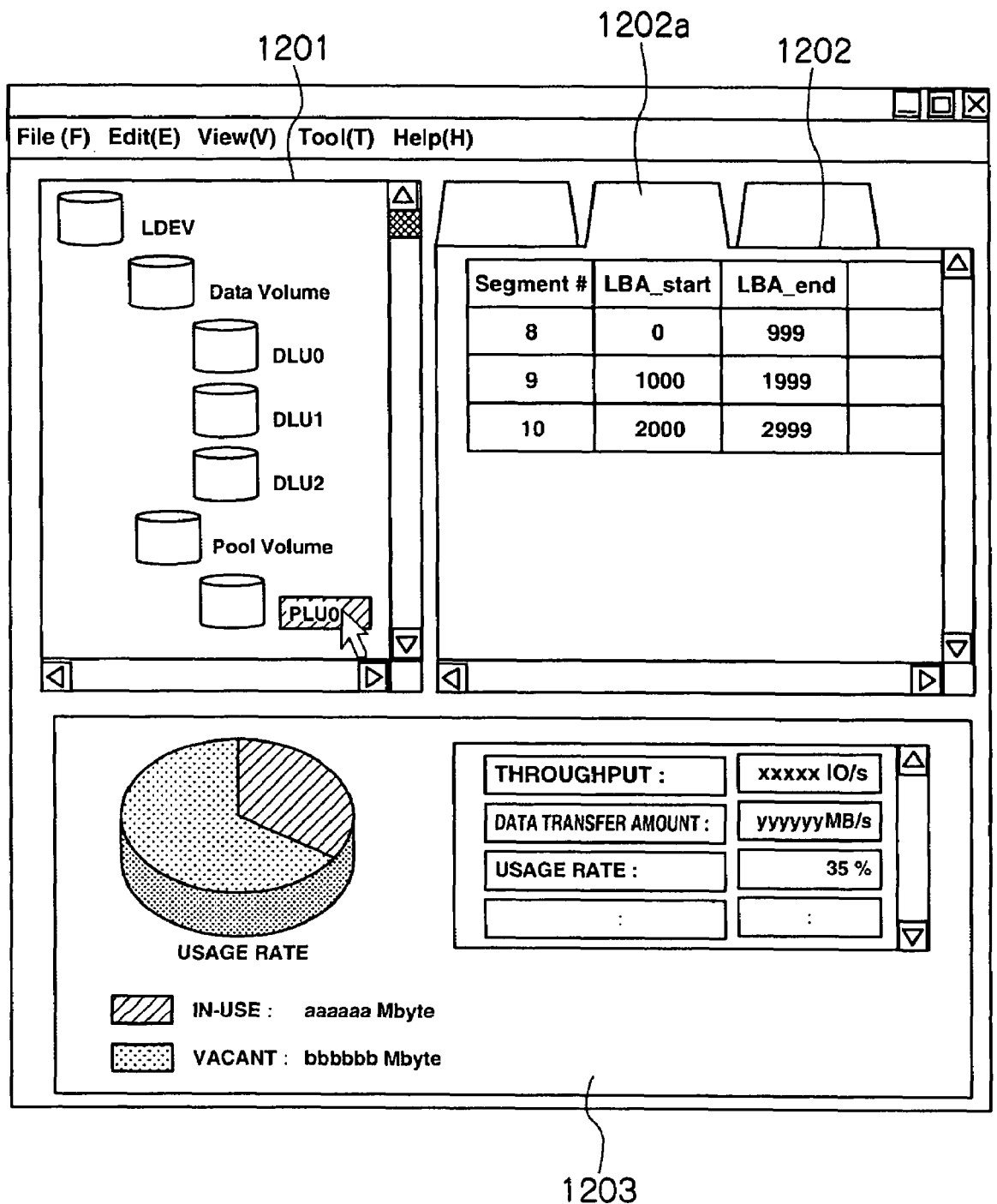
FIG. 12 is a diagram showing an example of a screen displayed on the management device according to an embodiment of this invention.

FIG. 12 is a diagram showing an example of a screen displayed on the local I/O device 434 in the management device 43 according to an embodiment of this invention. More specifically, it is a window showing the various properties of the logical volumes LU defined in the disk devices 41, particularly the details of the various properties of the pool volume PLU.

Under the control of the CPU 431, the management device 43 collects the system configuration information and operational information stored in the shared memory 424, accumulates them in the local storage device 435, and provides, via the user interface realized by the local I/O device 434, the collected various information to the system manager.

As shown in FIG. 12, the volume configuration area 1201 shows the logical volumes defined in the disk devices 41 in a hierarchy according to their attributes. In this example, the data volumes DLU0-DLU2 and the pool volume PLU0 are displayed in a hierarchy and the pool volume PLU0 is currently selected. If the data volume DLU0 is selected instead in the volume configuration area 1201, the real volume RLU0 and virtual volume VLU constituting that data volume DLU0 are shown in the lower layer of the data volume DLU0.

The volume detail area 1202 shows the detailed system configuration information for the volume LU selected in the volume configuration area 1201. Tabs 1202a are provided in this area and when, for example, one of the tabs 1202a is selected, the segment management table 4241 or address management table 4242 is displayed.

The operational information area 1203 shows the various properties collected from the operational information management table 4244 in the shared memory 424. It also shows the usage rate of the selected logical volume LU in the form of a graph, for example.

The window in FIG. 12 may also show the timing for migrating the data in the virtual volumes.

Figure 13:
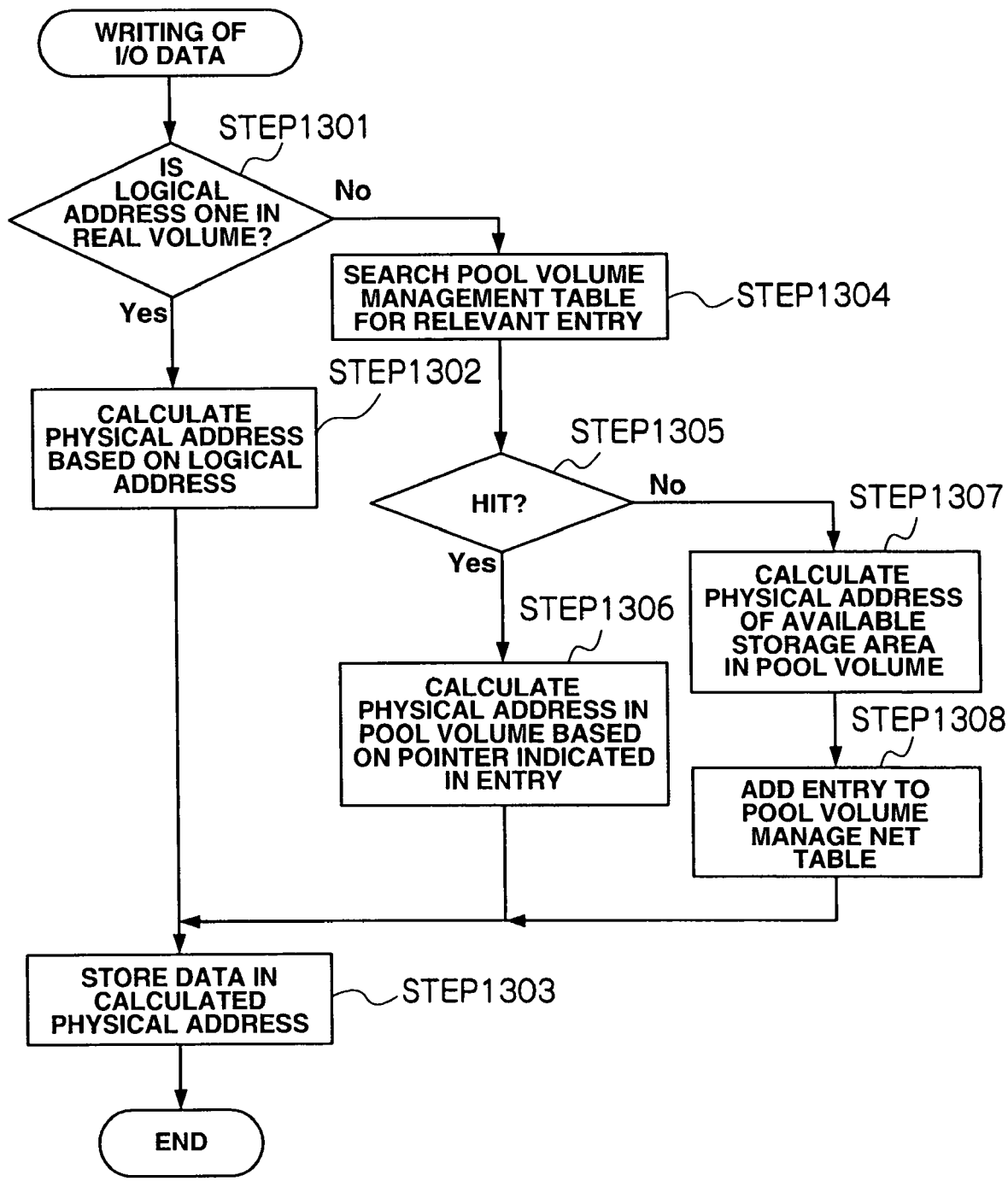
FIG. 13 is a diagram explaining a virtual volume providing function in the storage apparatus according to an embodiment of this invention.
Figure 14:
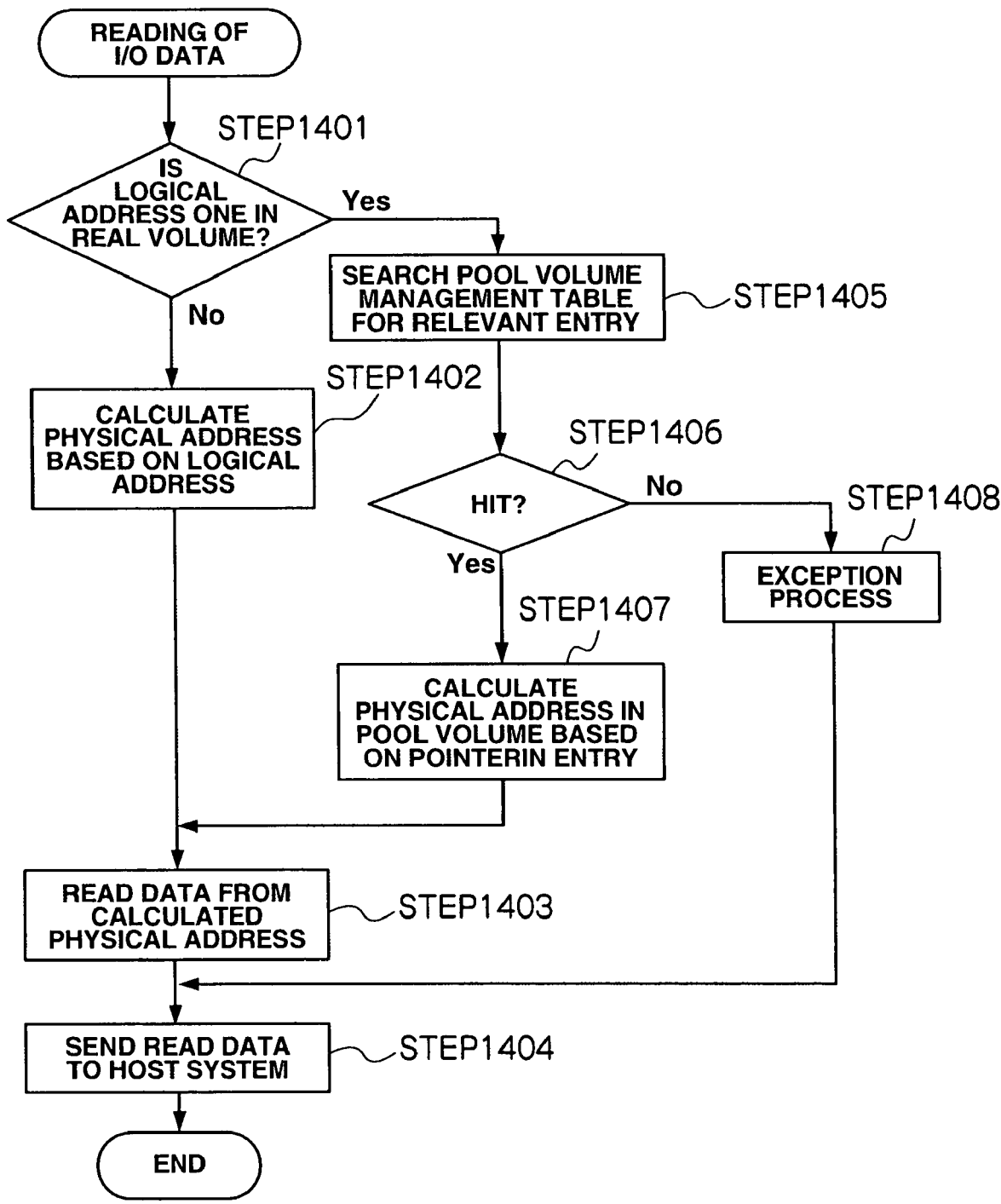
FIG. 14 is a diagram also explaining the virtual volume providing function in the storage apparatus according to the embodiment of this invention.

FIGS. 13 and 14 are diagrams explaining the virtual volume providing function in the storage apparatus 4 according to an embodiment of this invention. More precisely, FIG. 13 is a flowchart explaining the virtual volume providing function for a write request and FIG. 14 is a flowchart explaining the virtual volume providing function for a read request. In this embodiment, the virtual volume providing function is carried out under the control of the processor 4232 in each disk adapter 423.

When the disk adapter 423 obtains I/O data from the cache memory 422, it interprets the operation code in the I/O data. When the disk adapter 423 determines that the code is a write request, it also determines, by reference to the address management table 4242, whether or not the logical address designated in the I/O data is a logical address in a real volume (STEP1301 in FIG. 13). If it is determined that the logical address designated in the I/O data is a logical address in a real volume, the disk adapter 423 calculates, by reference to the segment management table 4241, the physical address corresponding to that logical address (STEP1302). Then the disk adapter 423 stores the actual I/O data in the predetermined storage area in the disk devices 41 having the calculated physical address (STEP1303).

If the logical address designated in the I/O data is not a logical address in a real volume, it means that the logical address is for a virtual volume, and thus the disk adapter 423 determines, by reference to the pool volume management table 4243, whether or not the designated logical address exists among the entries in the pool volume management table 4243 (STEP1304). If it is determined that the designated logical address exists among the entries in the pool volume management table 4243 (STEP1305; Yes), the disk adapter 423 calculates the corresponding physical address based on the pointer value obtained from the hit entry (STEP1306). The disk adapter 423 then stores the actual I/O data in the storage area in the disk devices 41 having the calculated physical address (STEP1303).

Further, if the designated logical address does not exist among the entries in the pool volume management table 4243 (STEP1305; No), the disk adapter 423 determines that the current write request is a first write request addressed to the storage area in the virtual volume. Accordingly, the disk adapter 423 specifies an available storage area in a pool volume, calculates its physical address (STEP1307), creates an entry, and registers it in the pool volume management table 4243 (STEP1308). An available storage area in the pool volume is typically the storage area next to the storage area where data has been stored most recently. The disk adapter 423 then stores the actual I/O data in the storage area in the disk device having the calculated physical address (STEP1303). As explained, for a data write request to a new storage area in a virtual volume, a new entry is added to the pool volume management table 4243.

Further, if the operation code in the I/O data obtained from the cache memory 422 is a read request, the disk adapter 423 judges, by referring to the address management table 4242, whether or not the logical address designated in the I/O data is a logical address in a real volume (STEP1401 in FIG. 14). If it is determined that the designated logical address is a logical address in the real volume, the disk adapter 423 calculates, by reference to the segment management table 4241, the physical address corresponding to the logical address (STEP1402). The disk adapter 423 then reads the data from the storage area in the disk device 41 having the calculated physical address (STEP1403), and writes it in the cache memory 422 (STEP1404). The data written in the cache memory 422 is thereafter sent from the channel adapter 421 to the host system 3 that made the read request.

If the logical address designated in the I/O data is not a logical address in a real volume, the logical address is a logical address in a virtual volume, and thus the disk adapter 423 determines, by reference to the pool volume management table 4243, whether or not the designated logical address exists among the entries in the pool volume management table 4243 (STEP1405). If it is determined that the designated logical address exists (STEP1406; Yes), the disk adapter 423 calculates the corresponding physical address based on the pointer value obtained from the hit entry (STEP1407). Then the disk adapter 423 reads the data from the storage area in the disk devices 41 having the calculated physical address (STEP1403) and writes it in the cache memory 422 so that it will be sent to the host system 3 (STEP1404).

If the designated logical address does not exist among the entries in the pool volume management table 4243 (STEP1406; No), it means that no data is written in that designated logical address in the virtual volume. Accordingly, the disk adapter 423 assumes that it has read Null data (e.g., '0') and writes it in the cache memory 422, which is an exception to the usual (STEP1404).

The data migration function in the storage apparatus 4 will be explained below. Here, data migration refers to the migration of data from pool volumes to real volumes.

Figure 15:
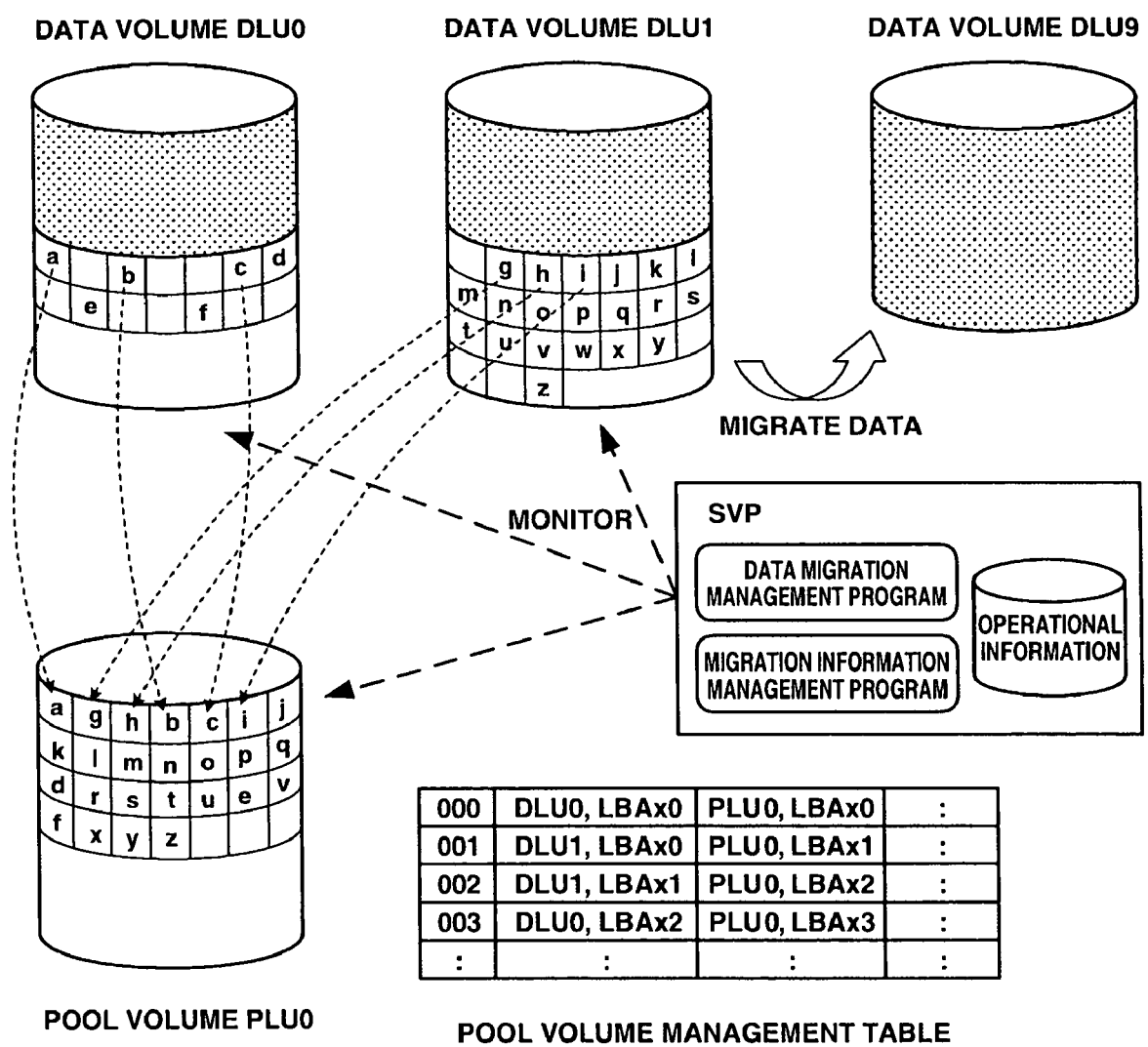
FIG. 15 is a schematic diagram explaining a data migration function in the storage apparatus according to an embodiment of this invention.

FIG. 15 is a diagram of the concept of the data migration function in the storage apparatus 4 according to an embodiment of this invention.

It is assumed that plural data volumes DLU and pool volumes PLU are defined in the disk devices 41. The data volumes DLU0 and DLU1 each contain a real volume and virtual volume. Incidentally, in FIG. 15, the real volumes in the data volumes DLU are shadowed.

Once a request to write data in a new storage area in a virtual volume is received, the data entity is written in a storage area in the pool volume PLU0 and a new entry is added to the pool volume management table 4243. For example, according to the entry '0,' the data 'a' in the logical address 'DLU0, LBAx0' is actually written in the physical storage area assigned the logical address 'PLU0, LBAx0' indicated by a pointer (not shown in the drawing). That physical storage area is the storage area in a segment in specified disk devices 41 constituting the pool volume PLU0. According to the entry '1,' the data 'g' in the logical address 'DLU1, LBAx0' is actually written in the logical address 'PLU0, LBAx1.'

The management device 43 collects the properties for the operational information, according to the operational information management program run under the control of the CPU 431. The management device 43 also monitors the usage rates of the virtual volumes in the data volumes DLU based on the collected operational information according to a data migration control program executed under the control of the CPU 431 and, for a virtual volume whose usage rate exceeds a predetermined threshold value, the management device 43 manipulates the control unit 42 to migrate the data stored in the corresponding storage area in the pool volume to a real volume. The data may be migrated not based on the usage rate of the virtual volume but on the usage rate of the pool volume PLU.

Figure 16:
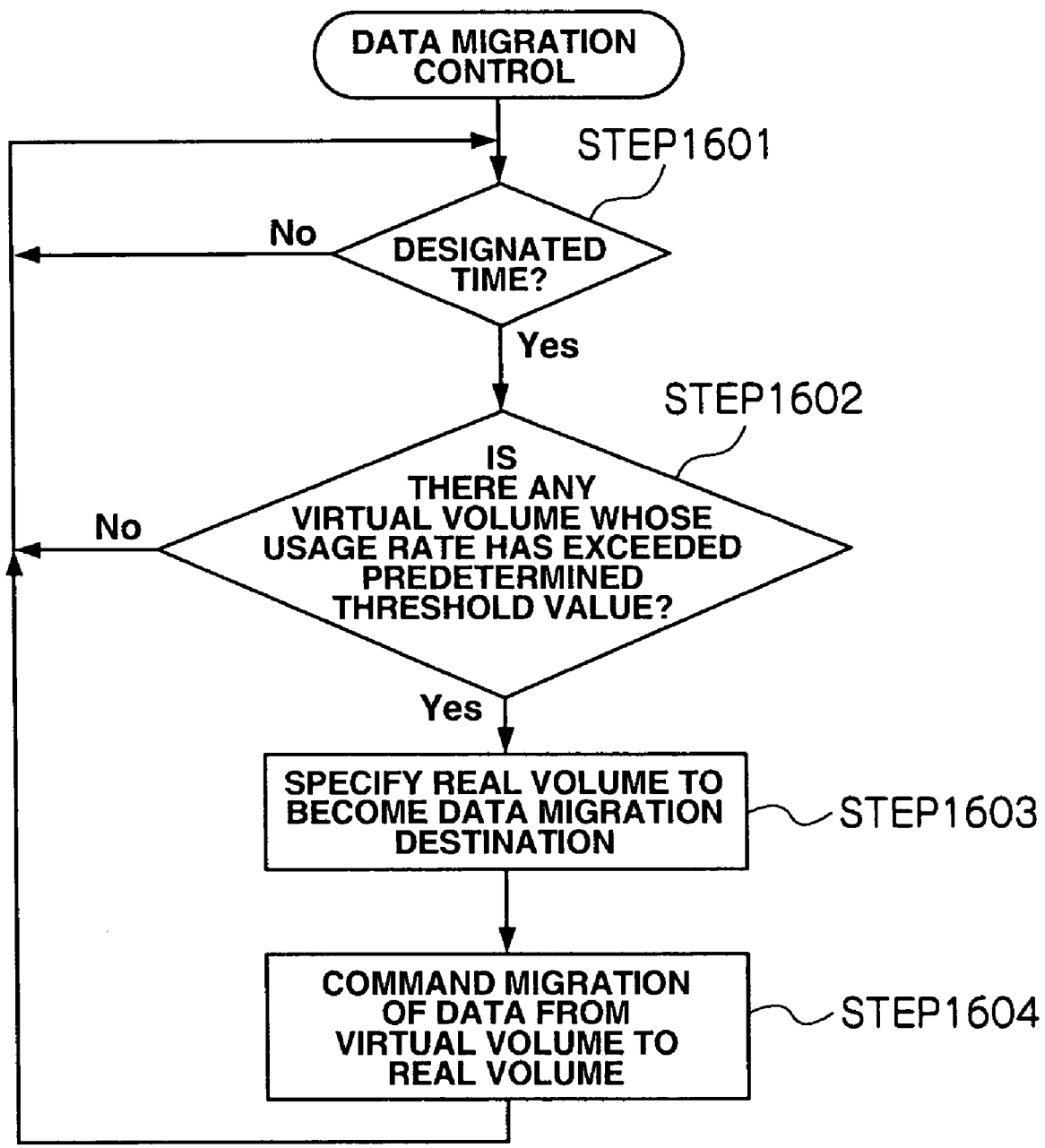
FIG. 16 is a diagram explaining data migration management by the management device according to an embodiment of this invention.

FIG. 16 is a diagram explaining the data migration management by the management device 43 according to an embodiment of this invention. The data migration management is carried out by running the data migration management program under the control of the CPU 431 in the management device 43.

The system administrator first creates a plan to check the usage rates of the virtual volumes. Specifically, before executing the data migration management program, the management device 43 sets a time interval for checking the usage rates of the virtual volumes. The time interval is set to, for example, 'every 24 hours.' Alternatively, the system manager may set a predetermined time, for example, 'at 24 pm.'

As shown in FIG. 16, when the time designated in advance is reached (STEP1601; Yes), the management device 43 checks whether or not there is a virtual volume whose usage rate has exceeded a predetermined threshold value based on the collected properties for the operational information (STEP1602). The threshold value of the usage rate is set in advance to, for example, 80%. If there is a virtual volume whose usage rate exceeds the threshold value, the management device 43 specifies a real volume in a data volume to which the data in that virtual volume VLU is migrated (STEP1603). For example, the management device 43 specifies an unused data volume DLU containing a real volume having a storage capacity of a size the same or larger than that of the virtual volume. Then management device 43 sends a command to the channel adapter 421 to migrate the data in the virtual volume to the specified real volume RLU in the data volume (STEP1604).

When there are plural virtual volumes whose usage rates exceed the predetermined threshold value, the management device 43 may command the migration of the data in all the virtual volumes. Alternatively, the management device 43 may command the migration of the data in the virtual volume having the highest usage rate. Otherwise, the management device may show the data migration target virtual volumes to the system manager via the user interface so that the manager can select any of them.

Figure 17:
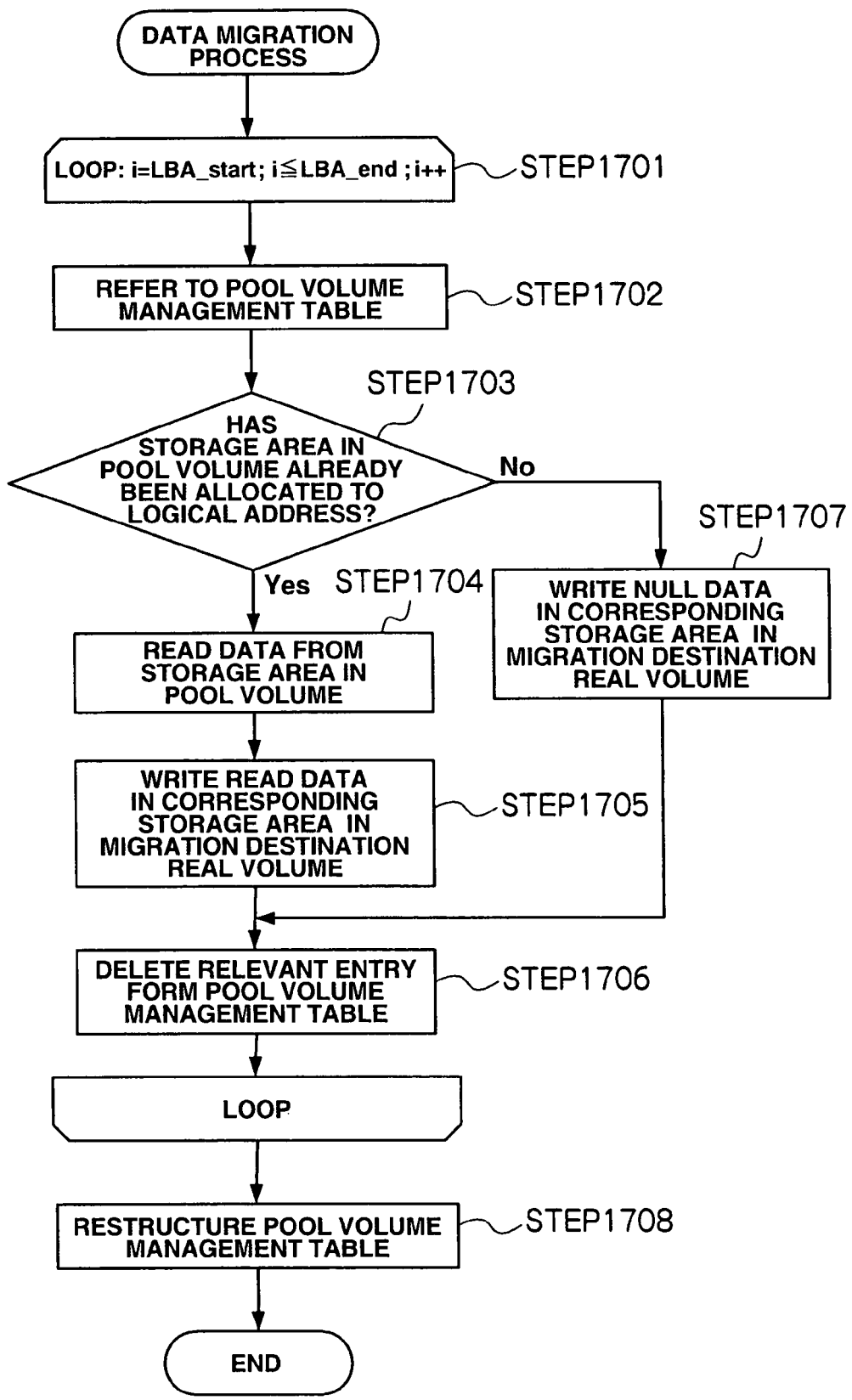
FIG. 17 is a diagram explaining the data migration process by the channel adapter according to an embodiment of this invention.

FIG. 17 is a diagram explaining the data migration process by the channel adapter 421 according to an embodiment of this invention. The data migration process is performed by running a data migration process program, for example, under the control of the CPU 4214 in a channel adapter 421.

When the channel adapter 421 receives a data migration command from the management device 43, it obtains, by reference to the address management table 4242, the start logical address and end logical address of the virtual volume having a collection of data to be migrated, and transfers the collection of data in the storage areas ranging from the start logical address to the end logical address to a real volume in order.

More specifically, as shown in FIG. 17, the channel adapter 421 first sets a target logical address (STEP1701) and refers to the pool volume management table 4243 to search for the logical address (STEP1702). The channel adapter 421 then checks whether or not there is any entry containing that logical address registered in the pool volume management table 4243 (STEP1703).

If the entry is in the pool volume management table (STEP1703; Yes), this means that a storage area in a pool volume PLU has already been allocated to that logical address. Accordingly, in that case (STEP1703; Yes), the channel adapter 421 sets a read request in the cache memory 422 so that the data is read from the corresponding storage area, according to the content of the entry (STEP1704). Then, in doing so, the disk adapter 423 reads the data and writes it in the cache memory 422. Then the channel adapter 421 sets a write request in the cache memory 422 so that the data written in the cache memory 422 is written in the corresponding storage area in the migration destination real volume (STEP1705). In doing so, the disk adapter 423 then stores the data in the corresponding storage area in the migration destination real volume. When the migration of data in the target logical address in the virtual volume is complete, the channel adapter 421 deletes the entry for the migrated data from the pool volume management table 4243 (STEP1706). Moreover, the disk adapter 423 releases the storage area in the pool volume that had stored the data.

In contrast, if there is no entry containing the target logical address in the pool volume management table 4243 (STEP1703; No), the channel adapter 421 sets a write request in the cache memory 422 so that null data is written in the corresponding storage area in the migration destination real volume (STEP1707). In doing so, the disk adapter 423 stores the null data in the corresponding storage area in the migration destination real volume.

After performing processing of the end logical address, the channel adapter 421 restructures the pool volume management table 4243 with the entries that have not been deleted, thereby reducing the size of the pool volume management table 4243 (STEP1708). At this time, the disk adapter 423 executes a defragmentation or garbage collection to the pool volume PLU in order to obtain the available storage areas in the pool volume.

Thus, all the pieces of data stored in the storage areas in the virtual volume VLU are migrated to the corresponding storage areas in the real volume RLU. Because the relevant entries in the pool volume management table 4243 are deleted due to the data migration, the size of the pool volume management table 4243 can be reduced. Further, by the restructure of the pool volume management table 4243, the performance of the search in the pool volume management table 4243 will not degrade.

FIGS. 18-21 explain the data migration process according to an embodiment of this invention, in chronological order.

Figure 18:
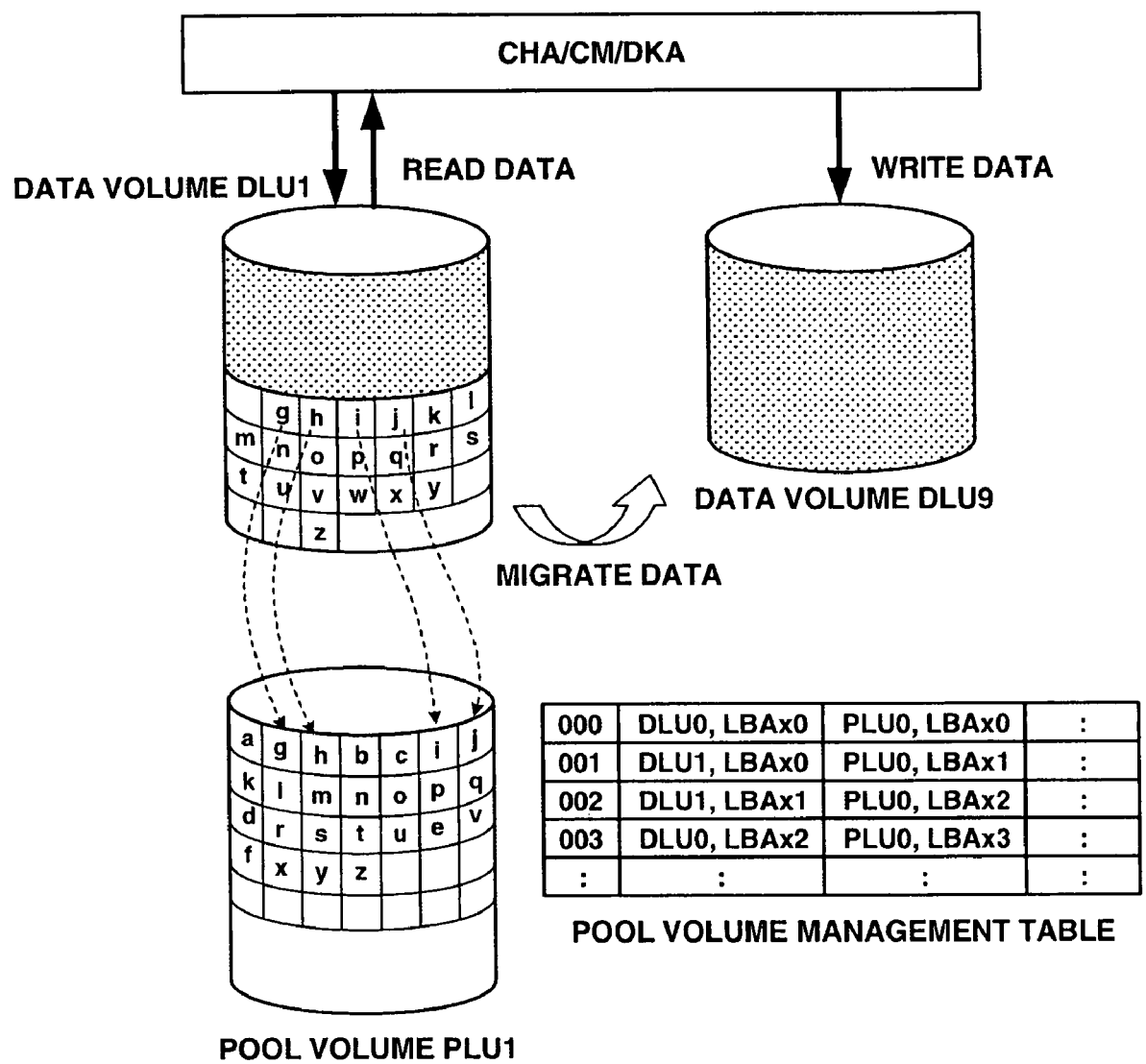
FIG. 18 is a diagram explaining the data migration process in the storage apparatus according to an embodiment of this invention.

First, as shown in FIG. 18, it is assumed that because the usage rate of the virtual volume in the data volume DLU1 exceeds the predetermined threshold value, the pieces of data in the virtual volume are to be migrated to the data volume DLU9. The data volume DLU9 is a logical volume composed only of a real volume.

Figure 19:
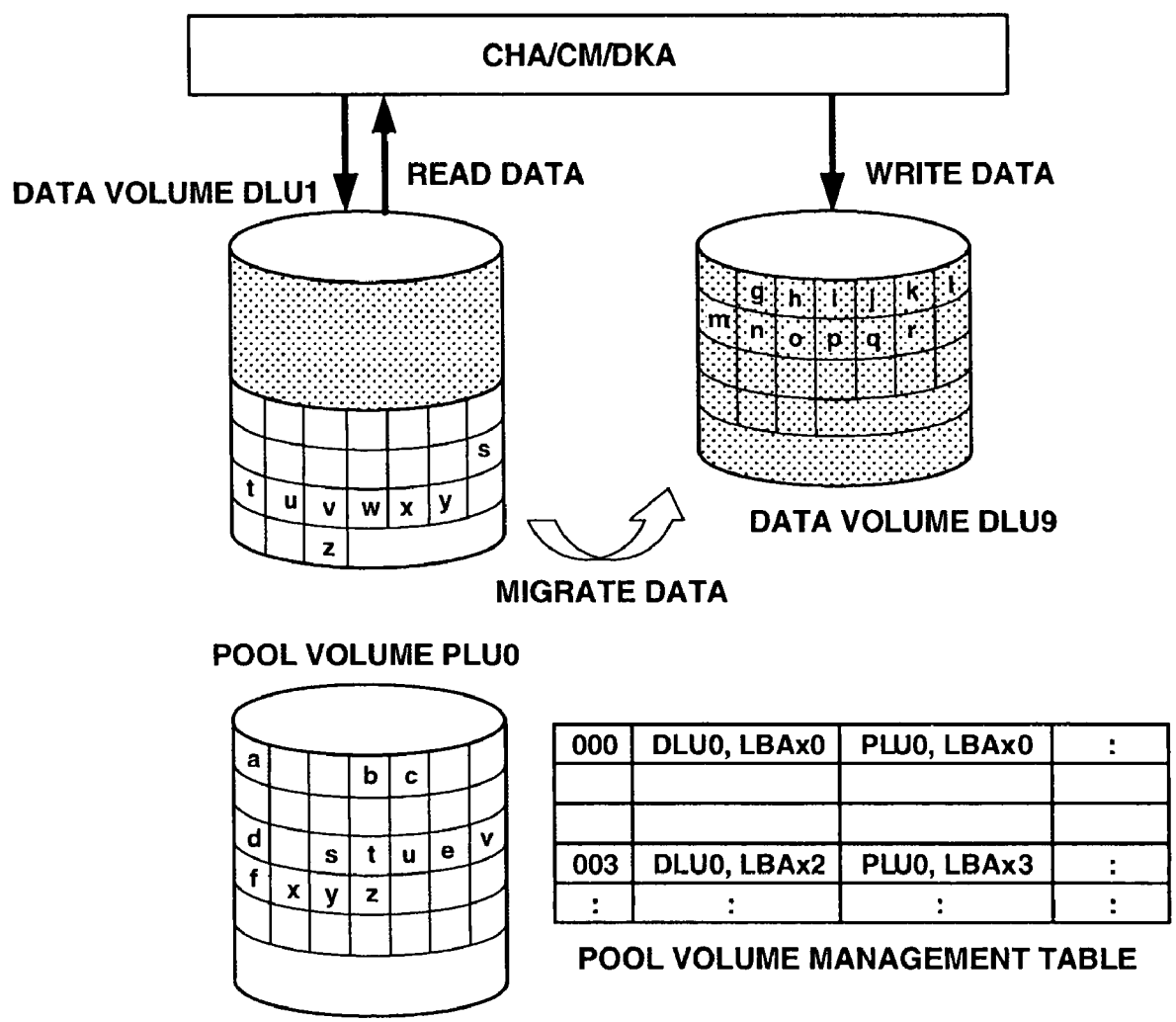
FIG. 19 is a diagram explaining the data migration process in the storage apparatus according to an embodiment of this invention.
Figure 20:
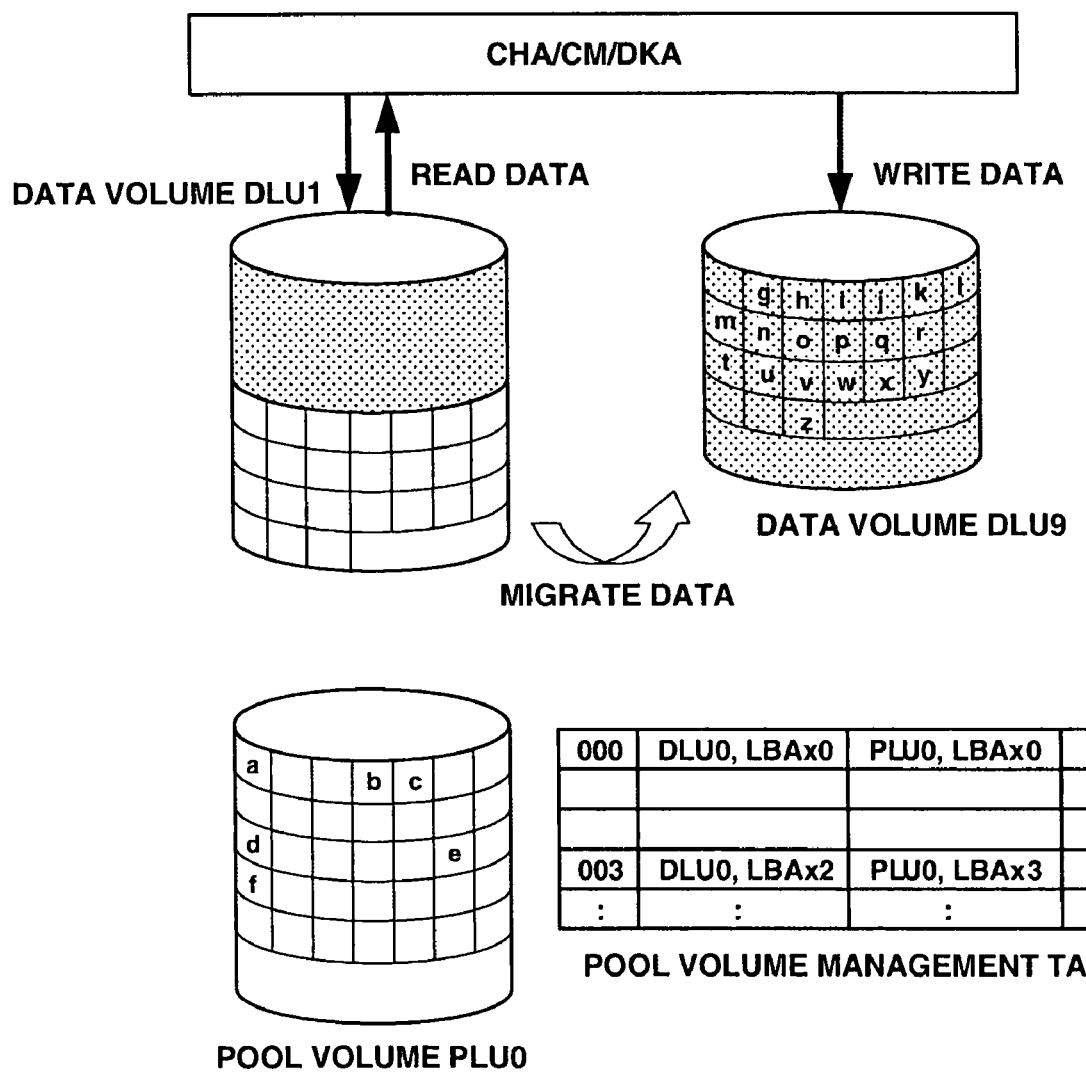
FIG. 20 is a diagram explaining the data migration process in the storage apparatus according to an embodiment of this invention.

The controller unit 42 refers to the pool volume management table 4243, reads the pieces of data in order from the corresponding storage areas in the pool volume PLU0, according to the content of the relevant entry, and writes them in the corresponding storage areas in the data volume DLU9. When completing the writing of the data in the pool volume PLU0 in the data volume DLU9, the controller unit 42 deletes the data in the virtual volume and pool volume PLU and deletes the entry from the pool volume management table 4243 (FIG. 19).

Figure 21:
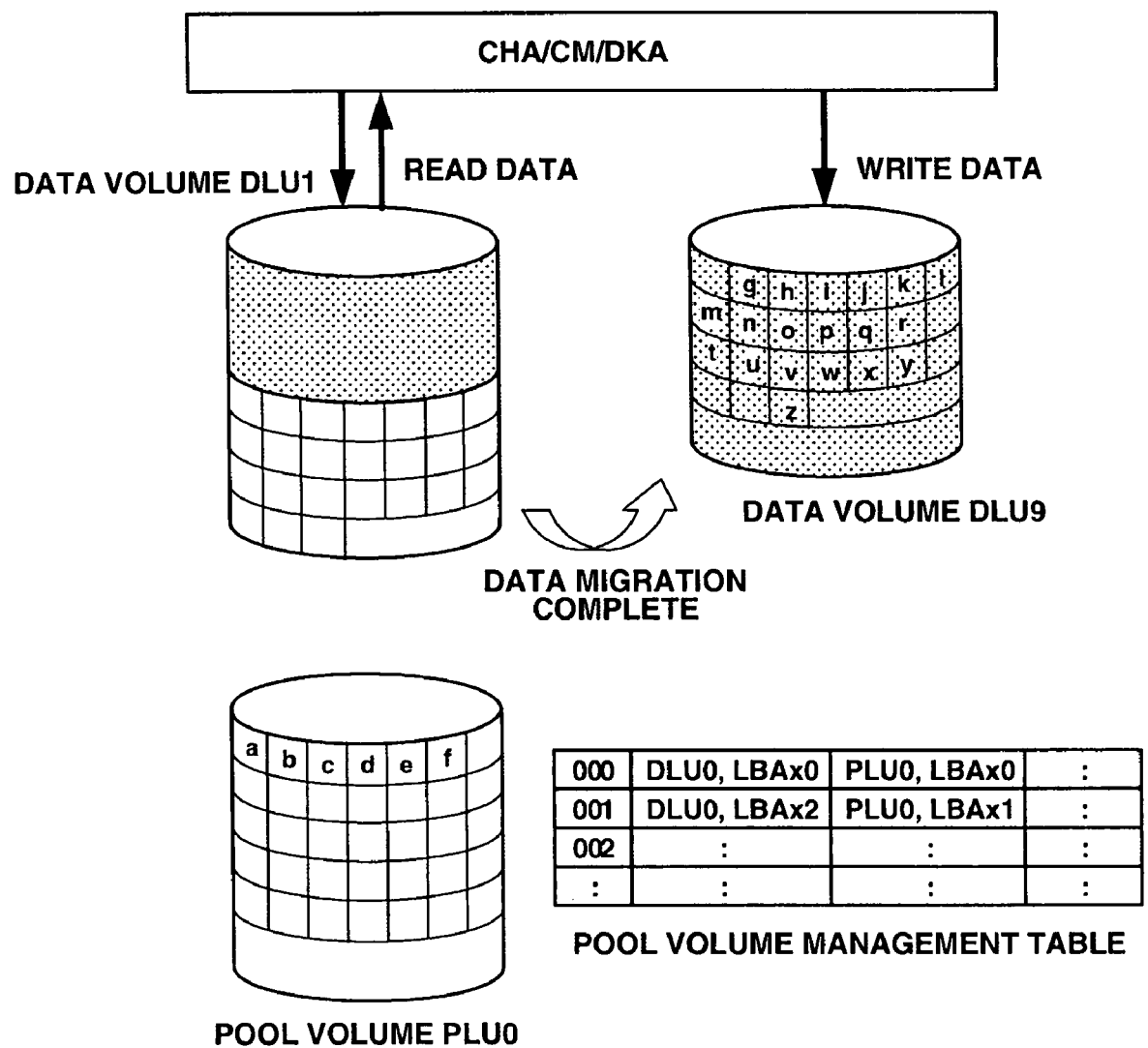
FIG. 21 is a diagram explaining the data migration process in the storage apparatus according to an embodiment of this invention.

When the migration of all the collections of data in the virtual volume VLU is complete (FIG. 20), the controller unit 42 restructures the pool volume management table 4243 and rearranges the data in the pool volume PLU (FIG. 21).

A modified example of this invention will be explained below. In the foregoing example, the management device 43 periodically checks whether or not the usage rates of virtual volumes have exceeded the predetermined threshold value. In the example below, the management device 43 predicts, based on the history of the shift in the usage rates, whether or not any usage rate is going to exceed the predetermined threshold value α days after the date designated by the system manager. An example of the prediction method may be the least-square method.

Figure 22:
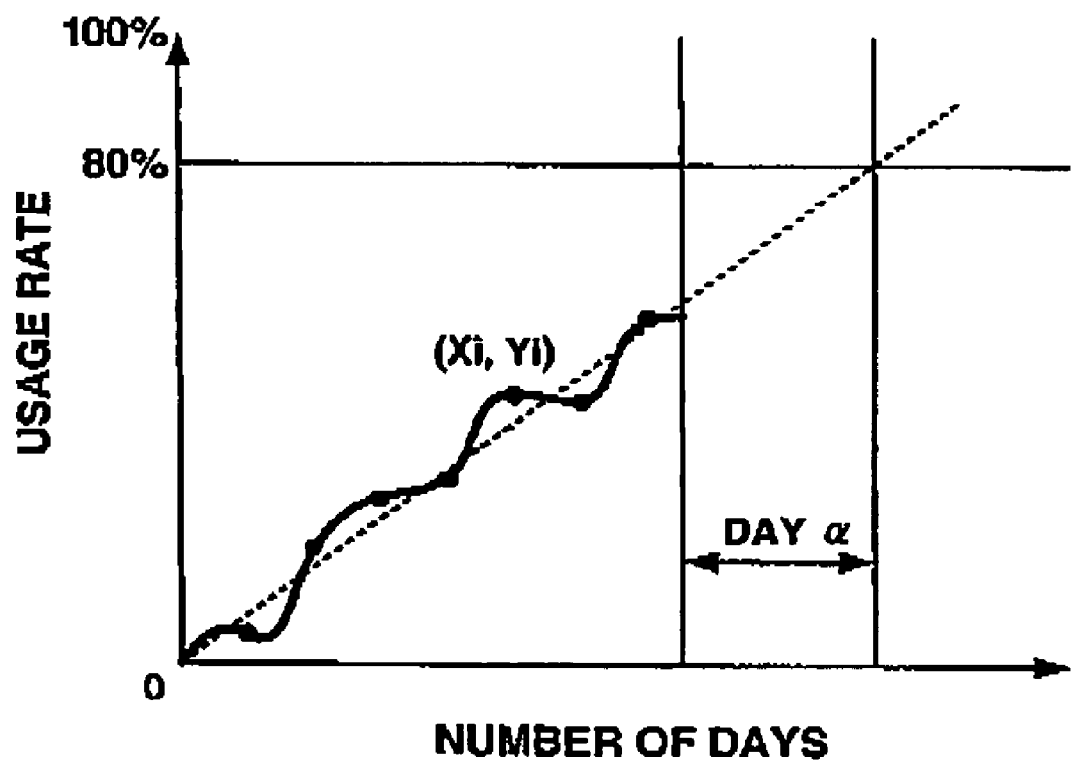
FIG. 22 is a diagram showing an example of the shift of a data usage rate in the storage apparatus according to an embodiment of this invention.

More specifically, as shown in FIG. 22, when the shift in the usage rate of a volume is (X1,Y1), (X2,Y2), ... and (Xn, Yn) and the prediction formula is Y=aX+b, coefficients 'a' and 'b' are obtained by the following formulas respectively:

$$a = \frac{n\sum_{i=1}^{n} X_i Y_i - \sum_{i=1}^{n} X_i \sum_{i=1}^{n} Y_i}{n\sum_{i=1}^{n} X_i^2 - \left(\sum_{i=1}^{n} X_i\right)^2}$$ [Formula 1]

$$b = \frac{n\sum_{i=1}^{n} X_i^2 \sum_{i=2}^{n} Y_i - \sum_{i=1}^{n} X_i Y_i \sum_{i=1}^{n} X_i}{n\sum_{i=1}^{n} X_i^2 - \left(\sum_{i=1}^{n} X_i\right)^2}$$ [Formula 2]

When the management devices 43 determines, using the above formulas 1 and 2, that a usage rate may exceed the predetermined threshold value α days after the date designated by the system manager, it sends a command to the channel adapter 421 to execute data migration. The least square method is used in this example but not limited thereto.

Figure 23:
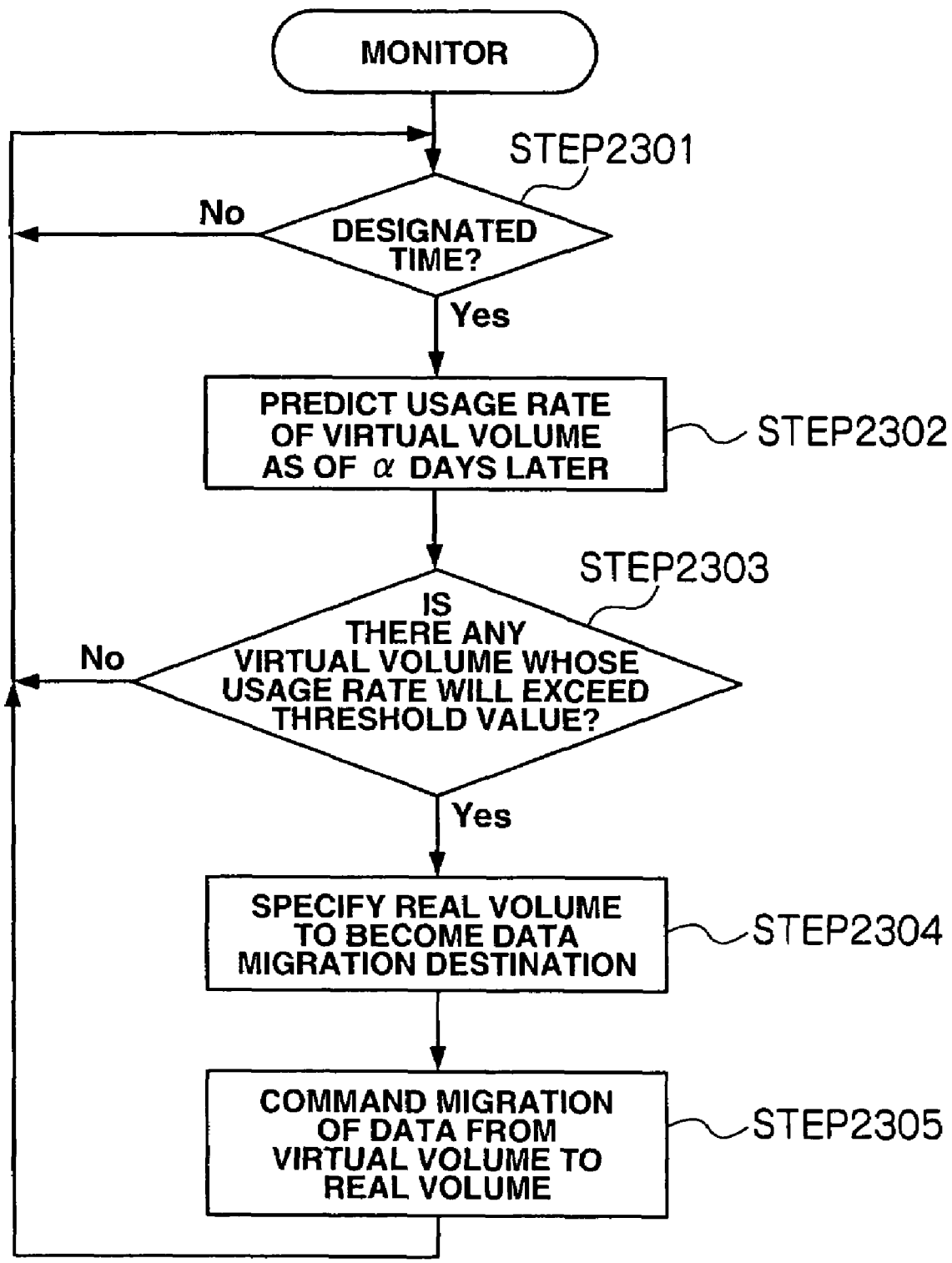
FIG. 23 is a diagram explaining the data migration management by the management device according to an embodiment of this invention.

FIG. 23 is a diagram explaining the data migration management by the management device 43 according to an embodiment of this invention. The data migration management is performed by running a data migration management program, for example, under the control of the CPU 431 in the management device 43.

The system manager first creates a plan to predict the usage rates of the virtual volumes VLU as of a days later. More specifically, prior to the execution of the data migration management program, the management device 43 sets a time interval for checking the usage rates of the virtual volumes and the number of days a until the predetermined threshold value is reached.

Referring to FIG. 23, when the time designated in advance is reached (STEP 2301; Yes), the management device 43 carries out the prediction formulas for finding out whether or not the usage rate of any virtual volume might exceed the predetermined value a days later, based on the collected properties for the operational information (STEP2302) and checks whether or not there is a virtual volume whose usage rate will exceed the predetermined value α days later (STEP2303). When the judgment is positive, it specifies a real volume RLU in a data volume to which the pieces of data in the virtual volume VLU are migrated (STEP2304). For example, the management device 43 specifies an unused data volume containing a real volume having the storage capacity of a size the same or larger than that of the virtual volume. Then the management device 43 sends a command to the channel adapter 421 to migrate the pieces of data in the virtual volume to the real volume in the specified data volume (STEP2305).

As described above, in this example, because the dates when the usage rates of the virtual volumes exceed the predetermined threshold value are predicted, the storage apparatus 4 can be operated appropriately in accordance with the history of the use of the virtual volumes.

Another embodiment will be explained below. In the above embodiment, the focus of attention was put on the usage rates of the virtual volumes, however, in this example below, it is put on the usage rates of the pool volumes.

Figure 24:
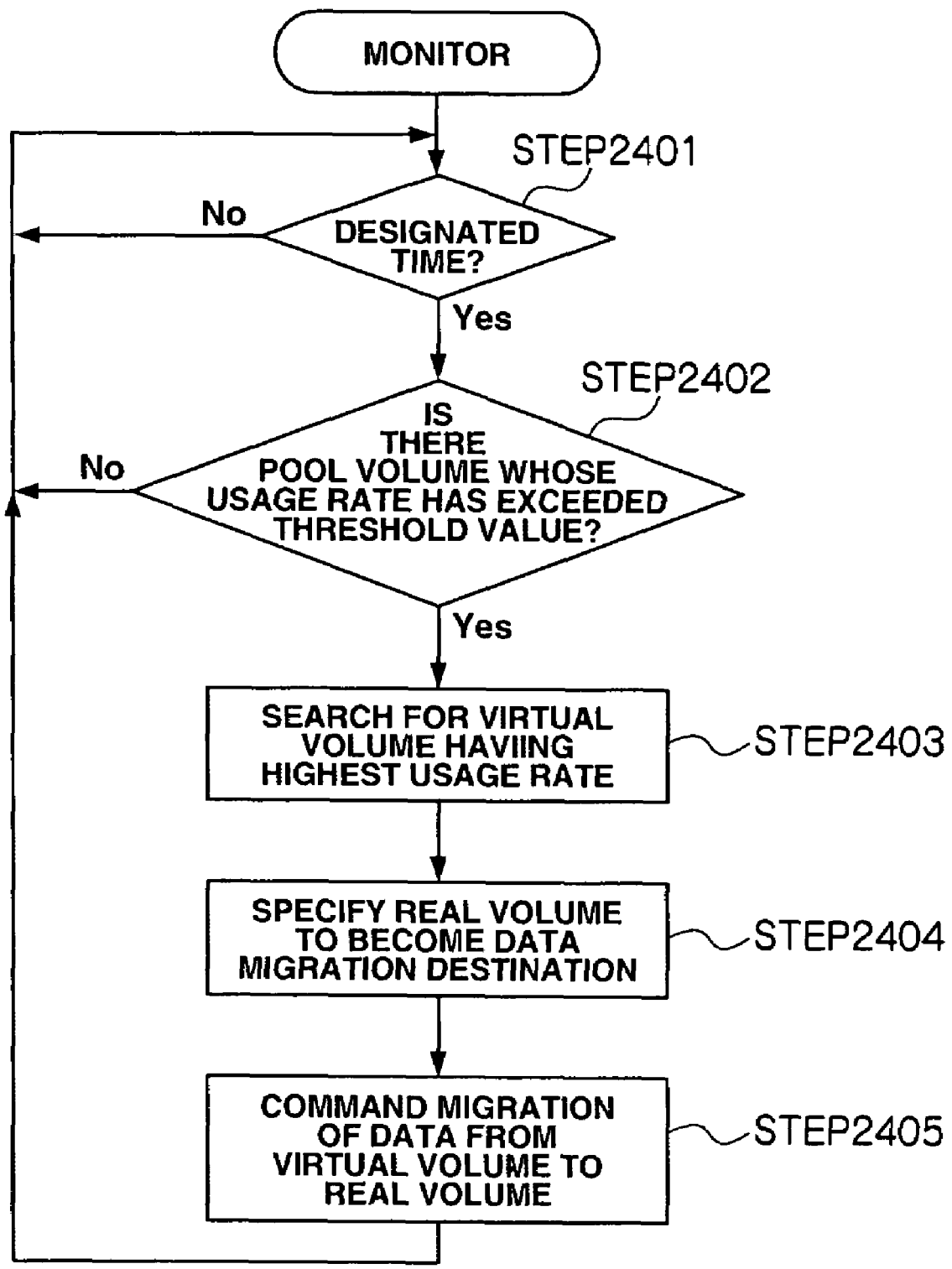
FIG. 24 is a diagram explaining the data migration management by the management device according to an embodiment of this invention.

FIG. 24 is a diagram explaining the data migration management by the management device 43 according to an embodiment of this invention. The data migration management is performed by running the data migration management program, for example, under the control of the CPU 431 in the management device 43.

The system manager first creates a plan to check the usage rates of the pool volumes. More precisely, prior to the execution of the data migration management program, the management device 43 sets a time interval (e.g., 'every 24 hours') for checking the usage rates of the pool volumes.

As shown in FIG. 24, when the time designated in advance is reached (STEP2401; Yes), the management device 43 determines, based on the collected properties for the operational information, whether or not there is any pool volume whose usage rate has exceeded a predetermined threshold value (STEP2402). The threshold value of the usage rate is set to, for example, 80%. If the a pool volume whose usage rate has exceeded the predetermined threshold value exists, the management device 43 searches for the virtual volume—virtual data storage destination—associated with the pool volume PLU and having the highest usage rate (STEP2403). The management device 43 then specifies a real volume RLU in a data volume to which the pieces of data in that virtual volume are migrated (STEP2404). For example, the management device 43 specifies an unused data volume containing a real volume having a storage capacity of a size the same or larger than that of the virtual volume. Then the management device 43 sends a command to the relevant channel adapter 421 to migrate the pieces of data in the virtual volume to the real volume RLU in the specified data volume (STEP2405).

According to this embodiment, when the usage rate of a pool volume PLU exceeds the predetermined threshold value, the pieces of data in the virtual volume associated with that pool volume PLU are migrated to a real volume, and as a result, the shortage of storage capacity in the pool volumes PLU can be prevented.

A modified example of this embodiment will be explained next. In the example below, the management device 43 predicts, in accordance with the history of the shift in usage rates, whether or not any usage rate might exceed the predetermined threshold value α days after the date designated by the system manager. An example of the prediction method may be the least square method.

Figure 25:
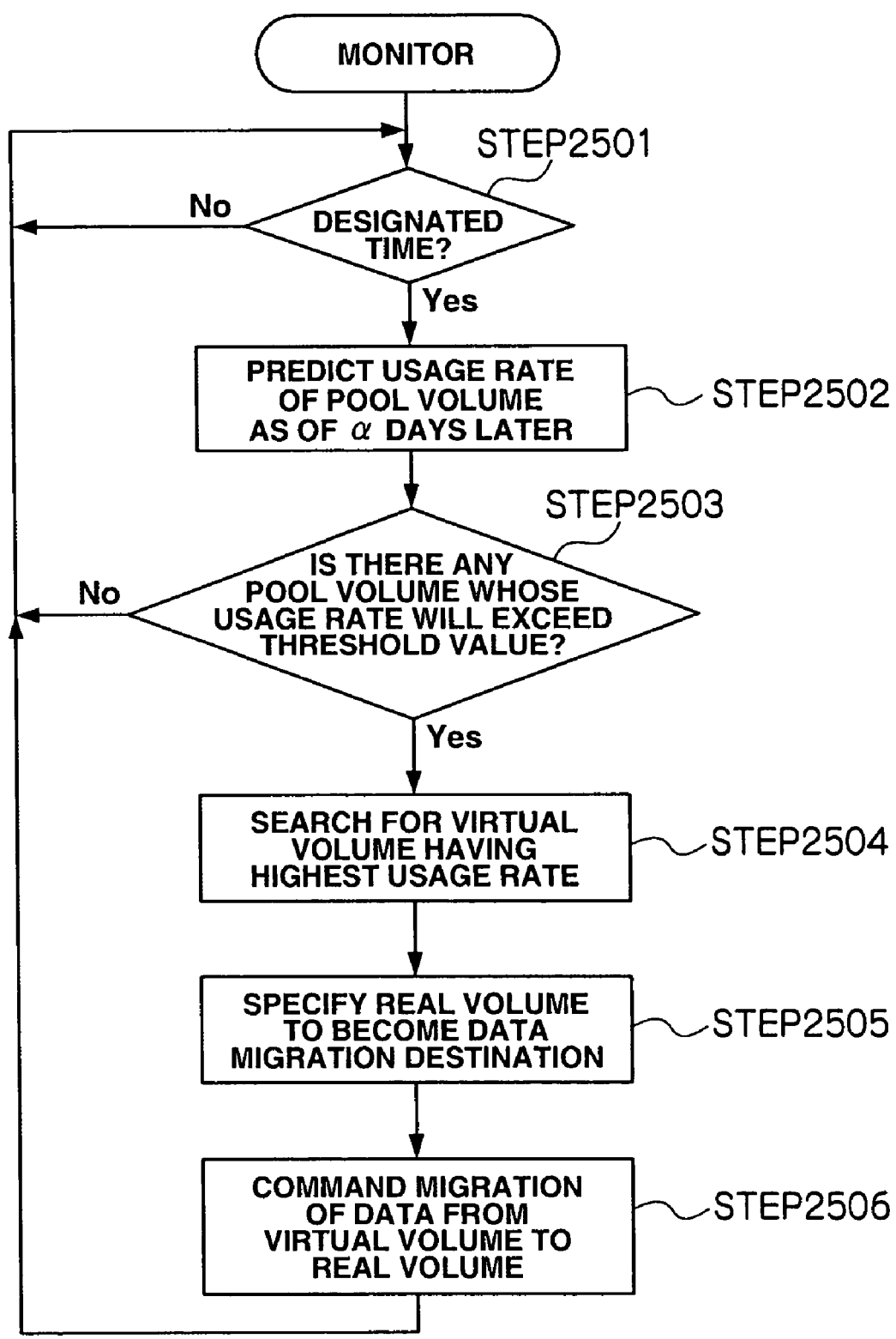
FIG. 25 is a diagram explaining the data migration management by the management device according an embodiment of this invention.

FIG. 25 is a diagram explaining the data migration management by the management device 43 according to this embodiment. The data migration management is performed by running the data migration management program, for example, under the control of the CPU 431 in the management device 43.

The system administrator first creates a plan to predict the usage rates of the virtual volumes VLU as of a days later. More specifically, prior to the execution of the data migration management program, the management device 43 sets a time interval for checking the usage rates of the virtual volumes and the predicted number of days a until the predetermined threshold value is reached.

As shown in FIG. 25, when the time designated in advance is reached (STEP2501; Yes), the management device 43 carries out the prediction formulas to find out whether or not the usage rates of the pool volumes will exceed the predetermined threshold value α days later, based on the collected properties for the operational information (STEP1502), and judges whether or not there is a pool volume whose usage rate will exceed the predetermined threshold value α days later (STEP2503). If a pool volume whose usage rate will exceed the predetermined threshold value, the management device 43 searches for the virtual volume—virtual data storage destination—associated with the pool volume PLU and having the highest usage rate (STEP2504). Then the management device 43 specifies a real volume in a data volume to which the pieces of data in the virtual volume VLU are migrated (STEP2505). For example, the management device 43 specifies an unused data volume containing a real volume having a storage capacity of a size the same or larger than that of the data volume. Then the management device 43 sends a command to the relevant channel adapter 421 to migrate the pieces of data in the virtual volume to the real volume in the specified data volume (STEP2505).

Because the days when the usage rates of the pool volumes exceed the threshold value are predicted in this example, the storage apparatus 4 can be operated appropriately in accordance with the history of the use of the pool volumes.

This invention can be widely applied to storage apparatuses having a plurality of disk devices.

While the invention has been described with respect to a limited number of embodiments, those who skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus, comprising:
   a storage device having a storage medium storing data; and
   a controller unit configured to manage a plurality of first type data volumes, a second type data volume and pool management information, and to control transfer of data to the storage device,
   wherein each volume of the plurality of first type data volumes provides a storage capacity, which is larger than the inherent storage capacity of a first physical storage area in the storage medium, to a host computer, each of the first type data volumes including a first real volume and a virtual volume,
   wherein the first real volume is already allocated to the first physical storage area in the storage medium before receiving a data write access to the first real volume included in one of the plurality of first type data volumes,
   wherein the virtual volume is not yet allocated to a second physical storage area before receiving a data write access to a virtual storage area of the virtual volume included in the first data volume included in the one of the plurality of first type data volumes, and the virtual volume is dynamically allocated to the second physical storage area achieved through a pool volume commonly used by the plurality of first type data volumes, when the data write access to the virtual storage area of the virtual volume included in the one of the plurality of first type data volumes is received,
   wherein the second type data volume provides a second type storage capacity, which is equal to the inherent storage capacity of a third physical storage area in the storage medium, to the host computer, and is a second real volume already allocated to the third physical storage area in the storage medium before receiving a data write access to the second type data volume,
   wherein the pool management information includes a plurality of sets of mapping information each mapping the virtual storage area of the virtual volume included in the one of the plurality of first type data volumes to the second physical storage area, which is achieved through the pool volume and is allocated to the virtual storage area of the virtual volume included in the one of the plurality of first type data volumes, and
   wherein the controller unit is configured to monitor a usage rate of the virtual volume of each of the plurality of first type data volumes, the controller unit is configured to, if the usage rate of the virtual volumes of the first one of the plurality of first type data volumes is over a threshold, migrate data from the second physical storage area, as allocated to the virtual volume of the first one of the plurality of first type data volumes, to the second type data volume, and the controller unit is configured to delete one set of the mapping information, corresponding to the virtual volume of the first one of the plurality of first type data volumes and included in the pool management information, to reduce the number of set in the plurality of sets of mapping information in the pool management information.

2. The storage apparatus according to claim 1, wherein the controller unit is configured to migrate the data from the second physical storage area in the pool volume to the second type data volume.

3. The storage apparatus according to claim 2, wherein the controller unit is configured to predict the usage rate, of the virtual volume of each of the plurality of first type data volumes, at a point in time designated in advance, and
   wherein the controller unit is configured to migrate the data from the second physical storage area to the second type data volume based on the predicted usage rate.

4. The storage apparatus according to claim 1, wherein the controller unit. is configured to predict the usage rate, of the virtual volume of each of the plurality of first type data volumes, at a point in time designated in advance, and
   wherein the controller unit is configured to migrate the data from the second physical storage area to the second type data volume based on the predicted usage rate.

5. A data management method for a storage apparatus comprising a storage device having a storage medium and a controller unit configured to control transfer of data to the storage device, the data management method comprising:
   managing a plurality of first type data volumes, a second type data volume and pool management information,
   wherein each volume of the plurality of first type data volumes provides a storage capacity, which is larger than the inherent storage capacity of a first physical storage area in the storage medium, to a host computer, each of the first type data volumes including a first real volume and a virtual volume,
   wherein the first real volume is already allocated to the first physical storage area in the storage medium before receiving a data write access to the first real volume included in one of the plurality of first type data volumes,
   wherein the virtual volume is not yet allocated to a second physical storage area before receiving a data write access to a virtual storage area of the virtual volume included in the first data volume included in the one of the plurality of first type data volumes, and the virtual volume is dynamically allocated to the second physical storage area achieved through a pool volume commonly used by the plurality of first type data volumes, when the data write access to the virtual storage area of the virtual volume included in the one of the plurality of first type data volumes is received,
   wherein the second type data volume provides a second type storage capacity, which is equal to the inherent storage capacity of a third physical storage area in the storage medium, to the host computer, and is a second real volume already allocated to the third physical storage area in the storage medium before receiving a data write access to the second type data volume,
   wherein the pool management information include a plurality of sets of mapping information each mapping the virtual storage area of the virtual volume included in the one of the plurality of first type data volumes to the second physical storage area, which is achieved through the pool volume and is allocated to the virtual storage area of the virtual volume included in the one of the plurality of first type data volumes, the data management method, further comprising:

monitoring the usage rate of the virtual volume of each of the plurality of first type data volumes;

migrating, if the usage rate of the virtual volume of the first one of the plurality of first type data volumes is over a threshold, data from the second physical storage area, allocated to the virtual volume of the first one of the plurality of first type data volumes, to the second type data volume; and deleting one set of the mapping information, corresponding to the virtual volume of the first one of the plurality of first type data volumes and included in the pool management information, thereby reducing the number of sets in the plurality of sets of mapping information in the pool management information.

6. The data management method according to claim 5, wherein the migrating step for migrating the data from the second physical storage area in the pool volume to the second type data volume.

7. The data management method according to claim 6, further comprising:

predicting the usage rate, of the virtual volume of each of the plurality of first type data volumes, at a point in time designated in advance, wherein the migrating step for migrating the data from the second physical storage area to the second type data volume based is on the predicted usage rate.

8. The data management method according to claim 5, further comprising:

predicting the usage rate, of the virtual volume of each of the plurality of first type data volumes, at a point in time designated in advance, wherein the migrating step for migrating the data from the second physical storage area to the second type data volume is based on the predicted usage rate.

9. A computer program stored in a memory and executable by a storage apparatus comprising a storage device having a storage medium and a controller unit configured to control transfer of data to the storage device, the computer program comprising:

a process for managing a plurality of first type data volumes, a second type data volume and pool management information, wherein each volume of the plurality of first type data volumes provides a storage capacity, which is larger than the inherent storage capacity of a first physical storage area in the storage medium, to a host computer, each of the first type data volumes including a first real volume and a virtual volume, wherein the first real volume is already allocated to the first physical storage area in the storage medium before receiving a data write access to the first real volume included in one of the plurality of first type data volumes, wherein the virtual volume is not yet allocated to a second physical storage area before receiving a data write access to a virtual storage area of the virtual volume included in the first data volume included in the one of the plurality of first type data volumes, and is dynamically allocated to the second physical storage area achieved through a pool volume commonly used by the plurality of first type data volumes, when the data write access to the virtual storage area of the virtual volume included in the one of the plurality of first type data volumes is received, wherein the second type data volume provides a second type storage capacity, which is equal to the inherent storage capacity of a third physical storage area in the storage medium, to the host computer, and is a second real volume already allocated to the third physical storage area in the storage medium before receiving a data write access to the second type data volume, wherein the pool management information include a plurality of sets of mapping information each mapping the virtual storage area of the virtual volume included in the one of the plurality of first type data volumes to the second physical. storage area, which is achieved through the pool volume and is allocated to the virtual storage area of the virtual volume included in the one of the plurality of first type data volumes, the computer program, further comprising:

a process for monitoring the usage rate of the virtual volume of each of the plurality of first type data volumes;

a process for migrating, if the usage rate of the virtual volume of first one of the plurality of first type data volumes is over a threshold, data from the second physical storage area, allocated to the virtual volume of the first one of the plurality of first type data volumes, to the second type data volume; and a process for deleting one set of the mapping information, corresponding to the virtual volume of the first one of the plurality of first type data volumes and included in the pool management information, to reduce the number of sets in the plurality of sets of mapping information in the pool management information.

10. The computer program according to claim 9, wherein the migrating-step for migrating the data from the second physical storage area in the pool volume to the second type data volume.

11. The computer program according to claim 10, further comprising:

a process for predicting the usage rate, of the virtual volume of each of the plurality of first type data volumes, at a point in time designated in advance, wherein the migrating process is a process for migrating the data from the second physical storage area to the second type data volume based on the predicted usage rate.

12. The computer program according to claim 9, further comprising:

a process for predicting the usage rate, of the virtual volume of each of the plurality of first type data volumes, at a point in time designated in advance, wherein the migrating process is a process for migrating the data from the second physical storage area to the second type data volume based on the predicted usage rate.

* * * * *